(12) United States Patent
Tokuchi

(10) Patent No.: US 10,791,264 B2
(45) Date of Patent: Sep. 29, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/936,446

(22) Filed: Mar. 27, 2018

(65) Prior Publication Data

US 2019/0082102 A1 Mar. 14, 2019

(30) Foreign Application Priority Data

Sep. 13, 2017 (JP) ................................. 2017-176002

(51) Int. Cl.
| | |
|---|---|
| H04N 5/232 | (2006.01) |
| H04N 5/77 | (2006.01) |
| H04N 9/82 | (2006.01) |
| H04N 5/907 | (2006.01) |
| H04N 9/804 | (2006.01) |

(52) U.S. Cl.
CPC ........... *H04N 5/23222* (2013.01); *H04N 5/77* (2013.01); *H04N 5/772* (2013.01); *H04N 5/907* (2013.01); *H04N 9/8042* (2013.01); *H04N 9/8205* (2013.01)

(58) Field of Classification Search
CPC .... H04N 5/23222; H04N 5/77; H04N 9/8042; H04N 9/8205; H04N 5/772; H04N 5/907
See application file for complete search history.

(56) References Cited

U.S. PATENT DOCUMENTS

| | | | | |
|---|---|---|---|---|
| 6,859,225 | B1* | 2/2005 | Silverbrook | G11B 7/0033 |
| | | | | 347/2 |
| 9,304,728 | B2* | 4/2016 | Tamura | H04N 1/00307 |
| 2002/0021304 | A1 | 2/2002 | Eguchi | |
| 2004/0080625 | A1* | 4/2004 | Kurosawa | H04N 5/23203 |
| | | | | 348/211.99 |
| 2005/0073594 | A1 | 4/2005 | Tagawa | |
| 2014/0098249 | A1* | 4/2014 | Park | G06T 11/00 |
| | | | | 348/207.2 |
| 2015/0057802 | A1* | 2/2015 | Kroyan | B25J 9/1697 |
| | | | | 700/259 |
| 2016/0105331 | A1* | 4/2016 | Han | H04L 12/282 |
| | | | | 715/736 |
| 2016/0194079 | A1* | 7/2016 | Montreuil | B64C 39/024 |
| | | | | 701/2 |
| 2017/0329347 | A1* | 11/2017 | Passot | A47L 11/4011 |
| 2018/0046172 | A1* | 2/2018 | Tao | G05D 1/0044 |
| 2018/0164117 | A1* | 6/2018 | Sakaguchi | G01C 21/3611 |
| 2018/0356813 | A1* | 12/2018 | Sun | G05D 1/0027 |
| 2019/0025822 | A1* | 1/2019 | Sentosa | G05D 1/0038 |
| 2019/0086913 | A1* | 3/2019 | Sugaya | B64C 39/024 |

FOREIGN PATENT DOCUMENTS

| | | |
|---|---|---|
| JP | 2002132558 | 5/2002 |
| JP | 2004120069 | 4/2004 |

* cited by examiner

*Primary Examiner* — Timothy J Henn
(74) *Attorney, Agent, or Firm* — JCIPRNET

(57) ABSTRACT

An information processing apparatus includes a receiver that receives an image, and a controller that controls an operation of the information processing apparatus based on information written in the image received by the receiver. In a further modification of the invention, the information may define an operation related to movement.

17 Claims, 25 Drawing Sheets

FIG.8
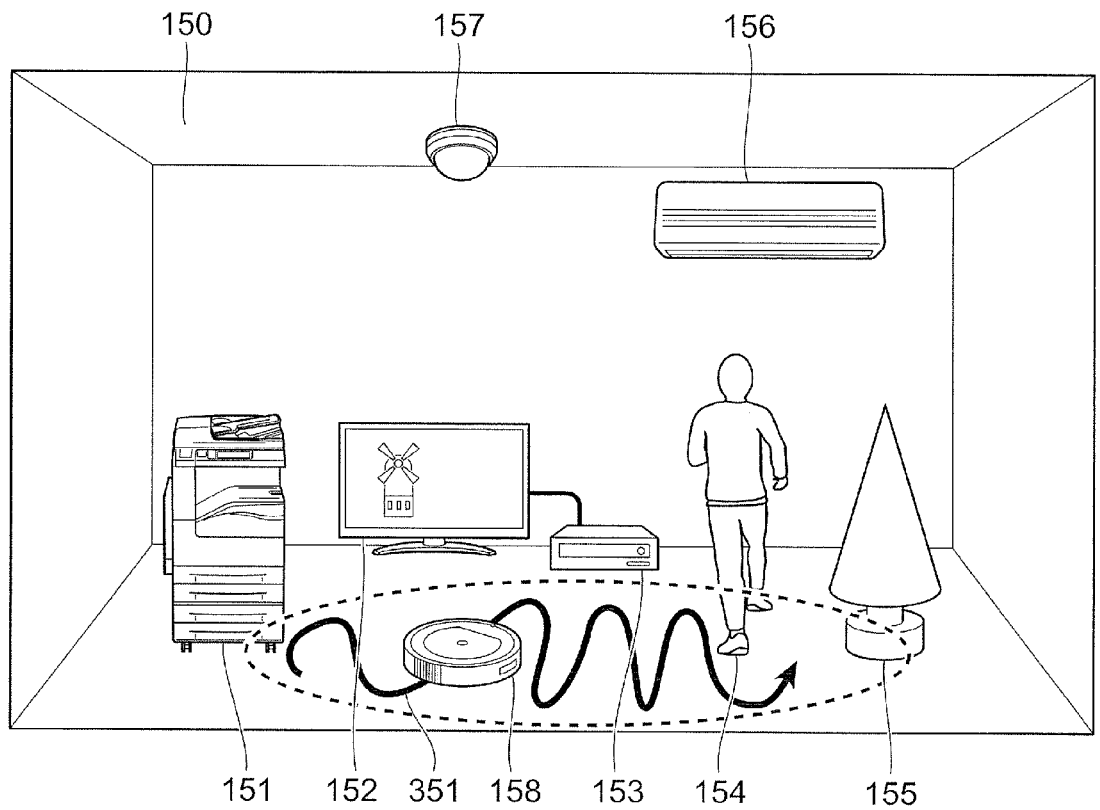
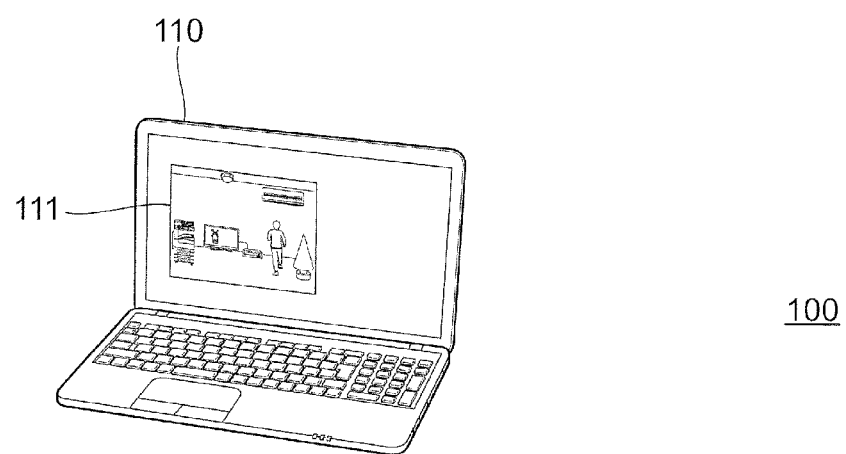

INFORMATION PROCESSING APPARATUS AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2017-176002 filed Sep. 13, 2017.

BACKGROUND

(i) Technical Field

The present invention relates to an information processing apparatus and a non-transitory computer readable medium.

(ii) Related Art

In general, a dedicated remote controller is provided to operate a device. Each remote controller has buttons for respective functions, and a user operates the buttons according to a desired operation.

SUMMARY

According to an aspect of the invention, an information processing apparatus includes a receiver that receives an image, and a controller that controls an operation of the information processing apparatus based on information written in the image received by the receiver.

BRIEF DESCRIPTION OF THE DRAWINGS

Exemplary embodiments of the present invention will be described in detail based on the following figures, wherein:

FIG. 8 is a view for explaining a specific example of cleaning by the cleaning robot;

FIG. 21A illustrates a data structure before the information is included in the attribute information of the JPEG file, and FIG. 21B illustrates a state in which the information is added to the attribute information of the JPEG file;

FIG. 24A is an example of writing for operating the air conditioner, and FIG. 24B is an example of writing for stopping the operation of the air conditioner.

DETAILED DESCRIPTION

Hereinafter, exemplary embodiments of the present invention will be described with reference to the accompanying drawings.

First Exemplary Embodiment

<Configuration of Image Processing System>

The configuration of an image processing system 100 according to a first exemplary embodiment will be described with reference to FIG. 1.

Figure 1:
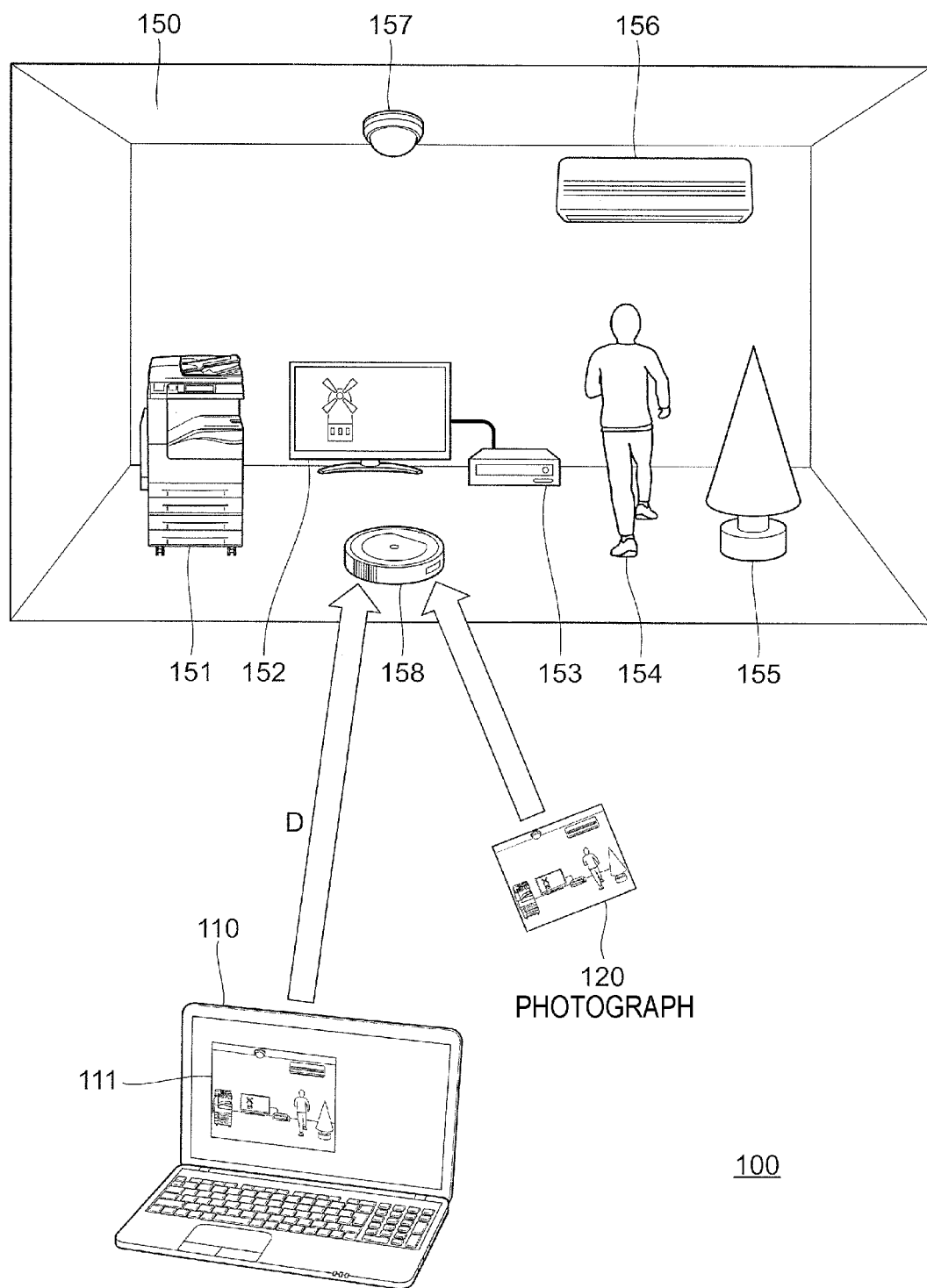
FIG. 1 is a view illustrating a configuration example of an image processing system used in a first exemplary embodiment.

FIG. 1 is a view illustrating a configuration example of the image processing system 100 used in the present exemplary embodiment.

The image processing system 100 includes a laptop computer 110 used to display a still image 111 (for example, electronic photograph), a photograph 120 obtained by printing the still image 111 on paper, and a real device existing within a real space 150 corresponding to a capturing place of the still image 111.

The computer 110 may exist in a space which is the same as or different from the real space 150. FIG. 1 illustrates an example in which the appearance of the computer 110 is a notebook computer. The appearance of the computer 110 is not limited to the notebook computer but may be a desktop computer, a smart phone, a game machine, or the like.

It is assumed that the real space 150 illustrated in FIG. 1 is an indoor room. In the real space 150, not only devices but also a living thing and a plant exist.

The real space 150 includes: an image forming apparatus 151 that has a function of forming an image on a recording material such as paper and a function of optically reading an image of a document; a display device 152 that displays a broadcast program or the like; a recording and reproducing device 153 that records a moving image or sound (hereinafter, referred to as a "moving image, etc.") in a recording medium or reproduces a moving image, etc. from a recording medium; a person 154; a planted tree 155; an air conditioner 156; a surveillance camera 157; and a cleaning robot 158.

Hereinafter, a description will be made of the configuration and operation of the cleaning robot 158 as a representative example among plural devices existing in the real space 150.

Figure 2:
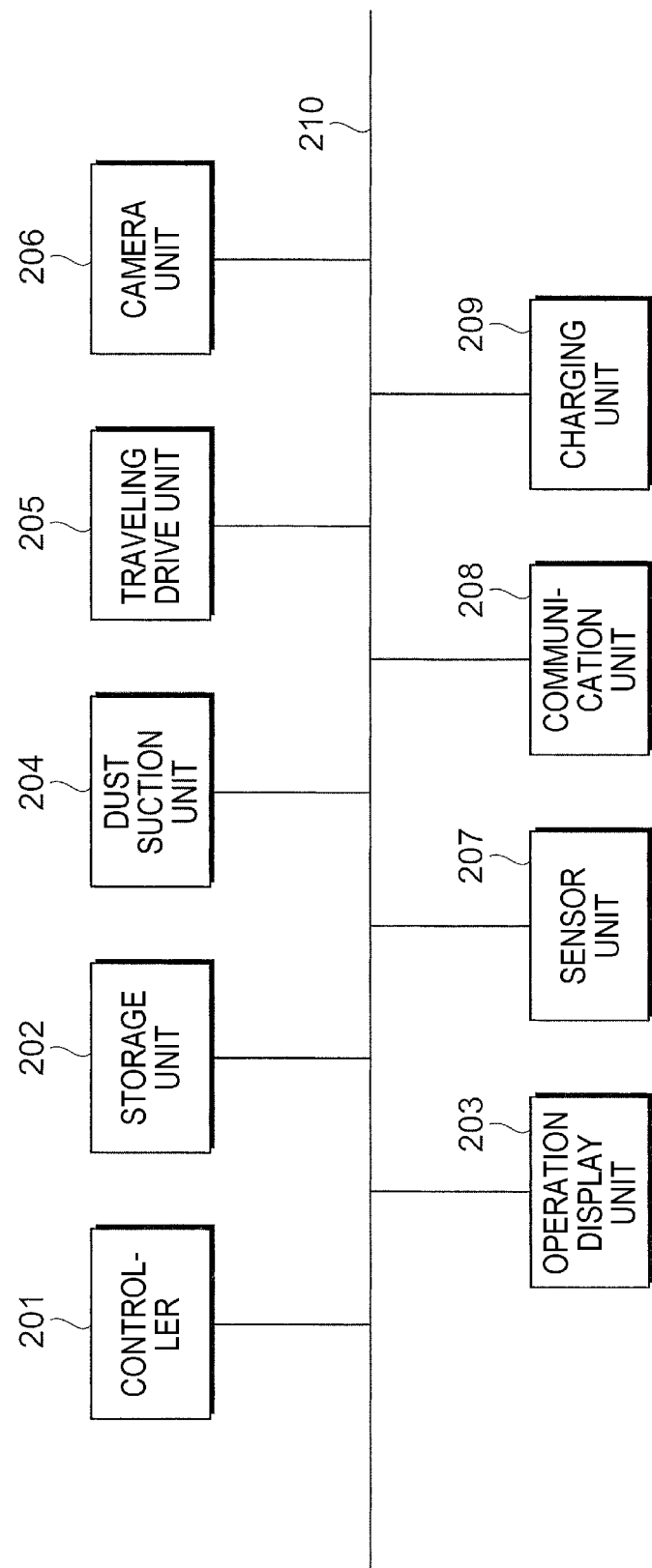
FIG. 2 is an example of a hardware configuration of a cleaning robot.

FIG. 2 is a view illustrating an example of a hardware configuration of the cleaning robot 158.

The cleaning robot 158 in the present exemplary embodiment is classified as a so-called self-propelled cleaner and includes a mechanism portion for cleaning and a mechanism portion for self-traveling.

The cleaning robot 158 includes a controller 201 that controls the entire device, a storage unit 202 that stores image data such as a floor plan, an operation display unit 203 that notifies a user of the states of buttons that receive operations by the user and the state of the device, a dust suction unit 204 that suctions dust and dirt (hereinafter, collectively referred to as "dust"), a traveling drive unit 205 that has a drive system for traveling, a camera unit 206 that captures the surrounding situation, a sensor unit 207 that acquires information on the presence or absence of dust and various information necessary for traveling, a communication unit 208 that communicates with an external device (for example, the computer 110), and a charging unit 209 that charges an embedded battery.

Further, the controller 201 and each unit are connected to each other via a bus 210.

The controller 201 is a so-called computer, and is configured with a central processing unit (CPU), a read only memory (ROM), and a random access memory (RAM) which are not illustrated.

The ROM stores a basic input/output system (BIOS) and firmware to be executed by the CPU. The RAM is used as the work area of the program.

Here, the controller 201 controls the operation of each unit through execution of firmware or the like. For example, the controller 201 controls the operation related to dust collection and the operation related to traveling.

The storage unit 202 is configured with a non-volatile rewritable storage device such as a semiconductor memory and a hard disk device.

The operation display unit 203 includes, for example, buttons that receive the user's operation and a light emitting diode (LED) indicator that indicates the operation state. Further, the operation display unit 203 may use a liquid crystal display or an organic electro-luminescence (EL) display.

The dust suction unit 204 is configured with a motor and other members that generate airflow which suctions the dust present on the floor surface of a traveling route together with air. The structure of the dust suction unit 204 differs depending on the dust collecting method employed.

The traveling drive unit 205 has, for example, wheels that move the main body, a motor that drives the wheels, and a steering mechanism.

The camera unit 206 is configured with an image sensor that captures surrounding information and an image of a photograph 120 (see FIG. 1) presented by the user. The camera unit 206 is configured with, for example, a charge coupled device (CCD), a complementary metal oxide semiconductor (CMOS) sensor, or the like. The captured image is stored in the storage unit 202. The above-described controller 201 reads and analyzes the image data stored in the storage unit 202. By this analysis, the controller 201 generates a floor plan of, for example, the real space 150, and detects the position of its own apparatus in the real space 150. In addition, the controller 201 processes an image corresponding to the photograph 120 (see FIG. 1) so as to control the operation of its own apparatus. Details of this operation will be described later.

The sensor unit 207 includes, for example, an obstacle sensor that measures the distance to an obstacle, a contact sensor that detects contact with the obstacle, a dust sensor that recognizes dust, a gyroscope sensor that measures the angle of the main body, an acceleration sensor that measures the acceleration, and an odometer sensor that measures the distance traveled.

The communication unit 208 is configured with a communication device used to communicate with, for example, a mobile phone network and a wireless communication network (Intranet of Things (IoT) network, a home network, or the like). Examples of the communication include WiFi (registered trademark), Bluetooth (registered trademark), and ZigBee (registered trademark).

Figure 3:
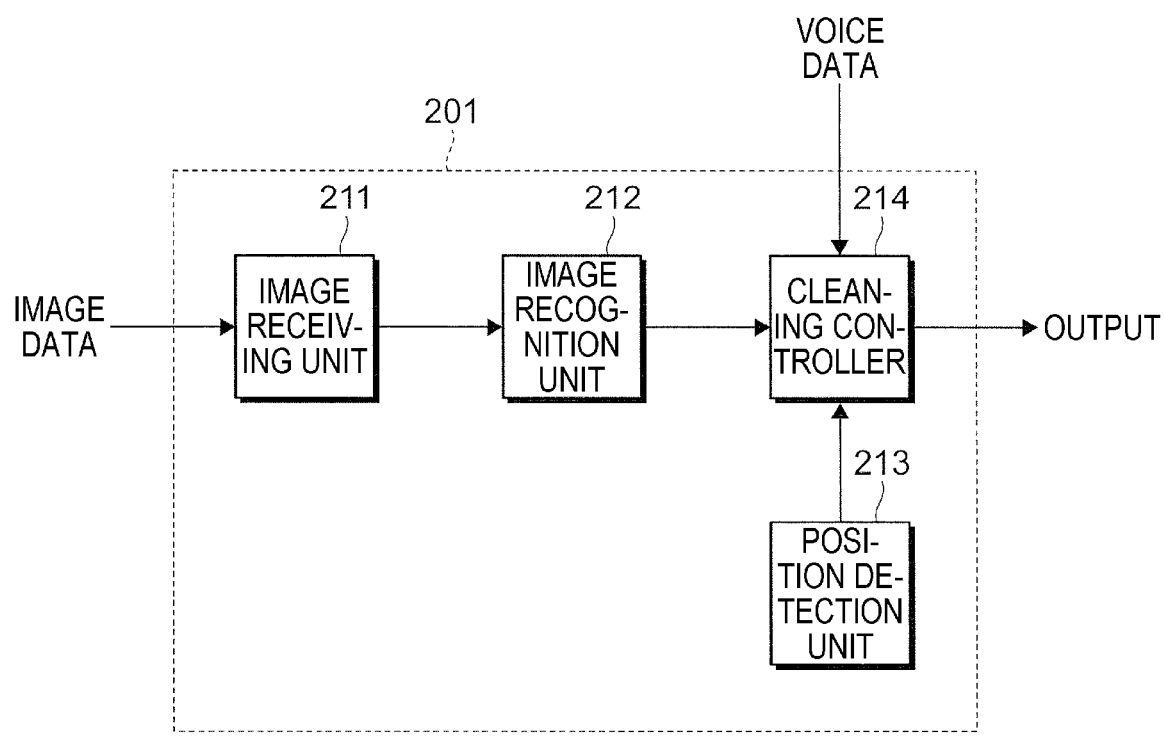
FIG. 3 is a view illustrating an example of a functional configuration of a controller constituting the cleaning robot according to a first exemplary embodiment.

FIG. 3 is a view illustrating an example of a functional configuration of the controller 201 constituting the cleaning robot 158 according to the first exemplary embodiment.

The functional configuration illustrated in FIG. 3 is implemented through execution of firmware by the controller 201.

The controller 201 of the present exemplary embodiment includes an image receiving unit 211, an image recognition unit 212, a position detection unit 213, and a cleaning controller 214. The image receiving unit 211 receives image data from the outside. The image recognition unit 212 recognizes information (writing to instruct an operation) included in the received image. The position detection unit 213 detects a position of its own apparatus in the real space 150. The cleaning controller 214 controls traveling of its own apparatus based on the recognized writing and the position of its own apparatus.

When there is voice data to assist the image data, the cleaning controller 214 controls the traveling of its own apparatus including the voice data as well.

The voice data is an example of sound data. Further, the image receiving unit 211 is an example of a receiver. The image recognition unit 212, the position detection unit 213, and the cleaning controller 214 are an example of a controller.

The image receiving unit 211 outputs image data of the photograph 120 captured by the camera unit 206 or image data of an image file received from the computer 110 through the communication unit 208 to the image recognition unit 212.

When the received image data includes writing to instruct the operation of its own apparatus, the image recognition unit 212 recognizes the contents of the instruction and outputs the recognized contents to the cleaning controller 214. For example, when the image corresponding to the image data (for example, the electronic photograph) includes its own apparatus and the writing that defines the moving range of its own apparatus (for example, the moving direction, route, and range) is recognized, the image recognition unit 212 outputs the recognized information to the cleaning controller 214.

Information that defines the moving range here is an example of information that defines the operation and an example of information on movement.

In the present exemplary embodiment, the information that defines the moving range is given by handwritten lines, handwritten figures, or the like. This is because it is difficult to instruct the cleaning route and cleaning range by input using the operation buttons or by words.

In particular, the handwritten lines and figures may be written on the photograph 120 (see FIG. 1) or written on the operation screen of the computer 110 (that is, writing onto the still image 111).

In the present exemplary embodiment, it is assumed that the moving range is mainly input through the user's handwriting. It should be noted that this assumption is not intended to exclude the generation of a route by an application software or the modification of the given route.

The information that defines the operation in the present exemplary embodiment includes information that defines a cleaning quality. The cleaning quality is an example of the quality of the operation. In the present exemplary embodiment, the cleaning quality includes, for example, the speed of movement (high speed, low speed, or the like) and the cleaning quality (thoroughly, briefly, or the like).

The cleaning quality is different from the information that defines the moving range, and may be easily designated by buttons or voice. For this reason, in the present exemplary embodiment, it is assumed that the cleaning quality is written in text on the image corresponding to the image data, or instructed by voice using a microphone (not illustrated).

The position detection unit 213 provides a function of detecting the position of its own apparatus in the real space 150.

For example, when the cleaning robot 158 has a function of generating the floor plan of the real space 150 using the history of the movement route or the like of its own apparatus, the position detection unit 213 detects the position of its own apparatus using the information of the floor plan generated by its own apparatus.

With respect to this, for example, when a receiving unit of an indoor global positioning system (GPS) is provided, the position detection unit 213 detects the position of its own apparatus in the real space 150 using an output signal of the receiving unit.

In addition, for example, the position detection unit 213 acquires an image of its own apparatus in the real space 150 through IoT communication with the surveillance camera 157 existing in the real space 150 and detects the position of its own apparatus by image recognition.

The cleaning controller 214 compares the moving range recognized by the image recognition unit 212 with the position detected by the position detection unit 213 so as to determine, for example, the range, route, and direction of cleaning to be performed by its own apparatus.

For example, the cleaning controller 214 specifically determines the cleaning route and cleaning range by converting the received electronic photograph (photograph 120) into a plan view and aligning the obtained plan view with the floor plan generated inside the cleaning robot 158.

The cleaning controller 214 performs alignment between feature points extracted from the plan view after conversion (for example, a boundary between a floor surface and a wall, objects, etc.) and the floor plan. For example, the cleaning controller 214 determines a place where an object is located using such a fact that the place corresponds to a portion which is not included in the floor plan generated by the cleaning robot 158 (since the cleaning robot 158 may not move to the portion, the portion is excluded from the floor plan). When completing the alignment, the cleaning controller 214 maps the cleaning route and range, which are on the plan view, onto the floor plan.

Further, when the floor plan is generated by an application (for example, MagicPlan (trademark)) that performs generation by 360°-capturing while the user stands at the center of the real space 150 and inputs the positions of the corners of the room and when the image used at the time of capturing is recorded in the storage unit 202, the alignment with the floor plan may be implemented by comparing the recorded image data with the electronic photograph.

Further, for example, the cleaning controller 214 may use an object captured by the surveillance camera 157 as a feature point, and specifically determine the cleaning route and range based on a positional relationship between the feature point and the position of its own apparatus.

<Example of Designation of Route Using Printed Matter (Electronic Photograph)>

Here, an example of designating the cleaning route or the like in the present exemplary embodiment will be described.

Figure 4:
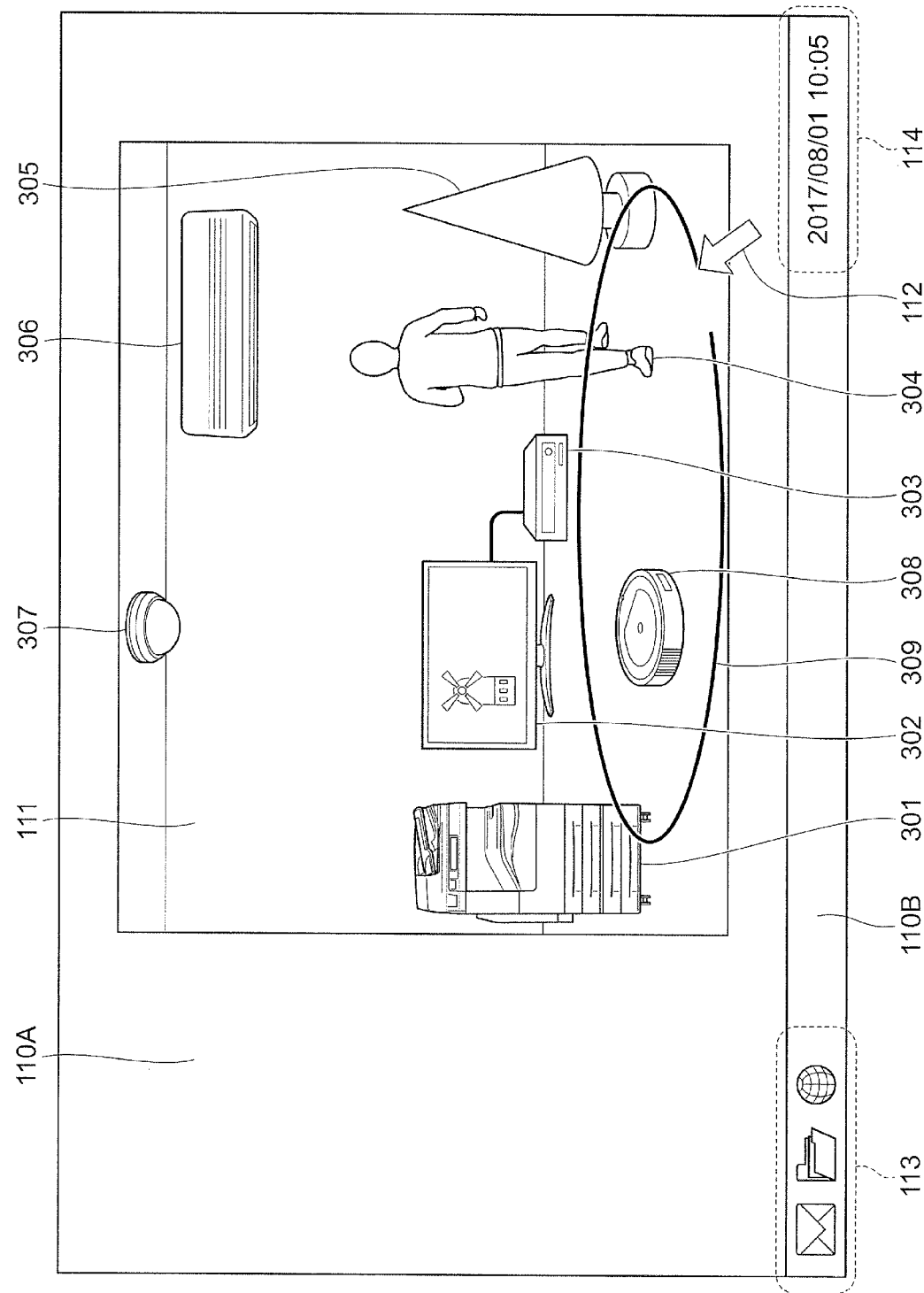
FIG. 4 is a view for explaining a state in which a cleaning range is input to a still image displayed on an operation screen of a computer using a mouse pointer.

FIG. 4 is a view for explaining a state in which the cleaning range is input, using a mouse pointer 112, to the still image 111 displayed on an operation screen 110A of the computer 110 (see FIG. 1).

On the operation screen 110A, the still image 111 obtained by capturing the real space 150 (see FIG. 1) is displayed in the form of a small screen (window).

The still image 111 illustrated in FIG. 4 includes an image 301 of an image forming apparatus, an image 302 of a display device, an image 303 of a recording and reproducing device, an image 304 of a person, an image 305 of a planted tree, an image 306 of an air conditioner, an image 307 of a surveillance camera, and an image 308 of a cleaning robot.

A task bar 110B is provided below the operation screen 110A, and icons 113 of the three active applications and the current time 114 are displayed on the task bar 110B.

The still image 111 shows a state of the real space 150 at a certain time (see FIG. 1). Therefore, the positions of the image 304 of the person and the image 308 of the cleaning robot are generally different from the positions of the person 154 (see FIG. 1) and the cleaning robot 158 (see FIG. 1) at the current time. In addition, persons existing in the real space 150 and the number of persons at the time of capturing the still image 111 are different from those at the current time.

The user draws a range which he/she wants the cleaning robot 158 to clean within the still image 111, with the mouse pointer 112. In the example of FIG. 4, a trajectory 309 where the mouse pointer 112 has moved is indicated by an ellipse.

The input method illustrated in FIG. 4 is used when, for example, image data (electronic photograph) in which the trajectory 309 is drawn on a still image 111 is transmitted from the computer 110 to the cleaning robot 158.

Figure 5:
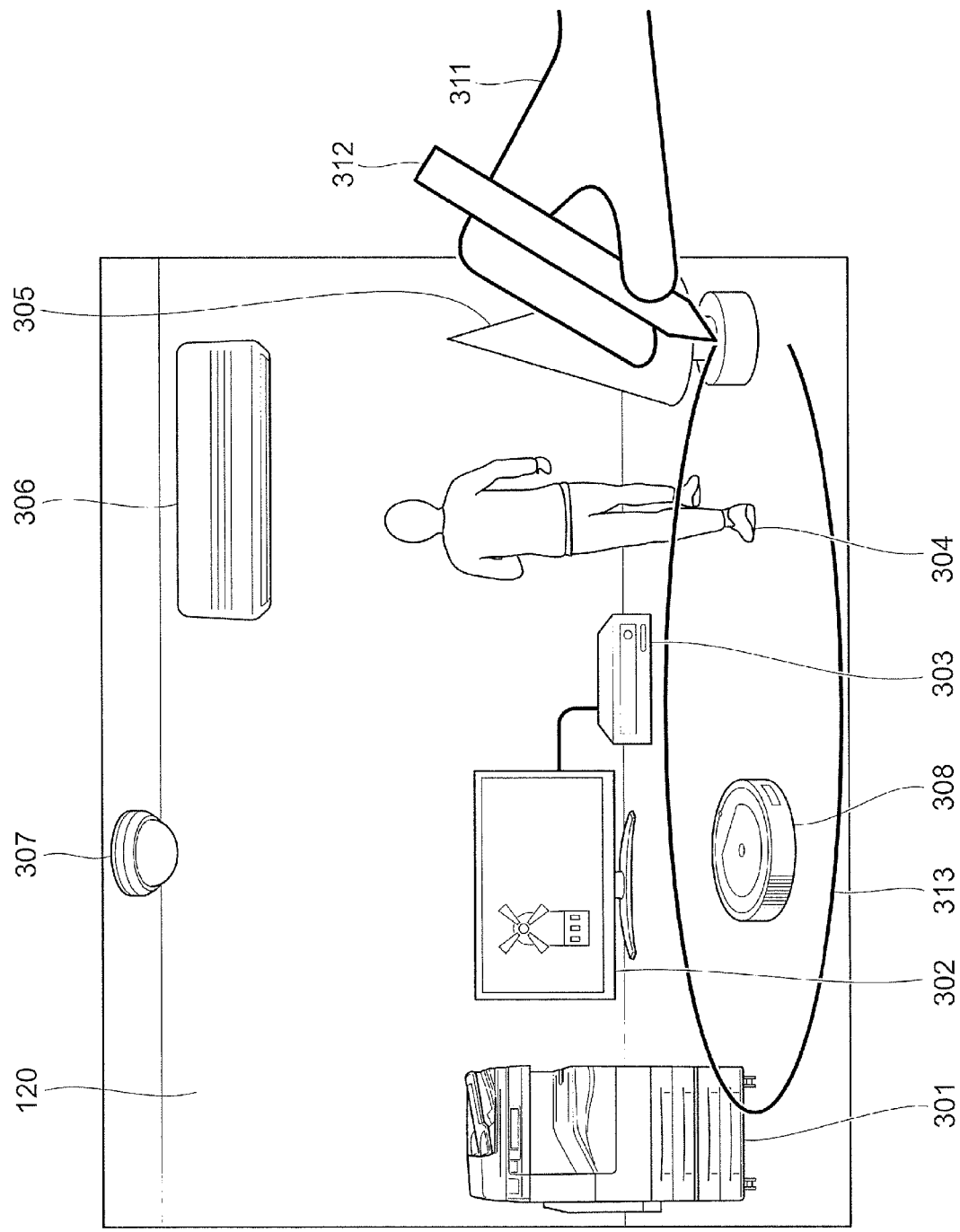
FIG. 5 is a view for explaining a state in which a user draws an enclosing line indicating a cleaning range using a pen on a photograph.

FIG. 5 is a view for explaining how the user (hand 311) draws an enclosing line 313 indicating the cleaning range on the photograph 120, using a pen 312.

In FIG. 5, portions corresponding to those in FIG. 4 are denoted by the same reference numerals. The photograph 120 illustrated in FIG. 5 corresponds to the still image 111 (see FIG. 4).

The input method illustrated in FIG. 5 is used when the user holds the photograph 120, on which the enclosing line 313 is drawn, in front of the camera unit 206 (see FIG. 2) of the cleaning robot 158 (see FIG. 1), thereby giving image data (photographic image) to the cleaning robot 158.

<Example of Processing Operation>

Here, an example of a processing operation executed by the cleaning robot 158 (see FIG. 1) will be described with reference to FIG. 6.

Figure 6:
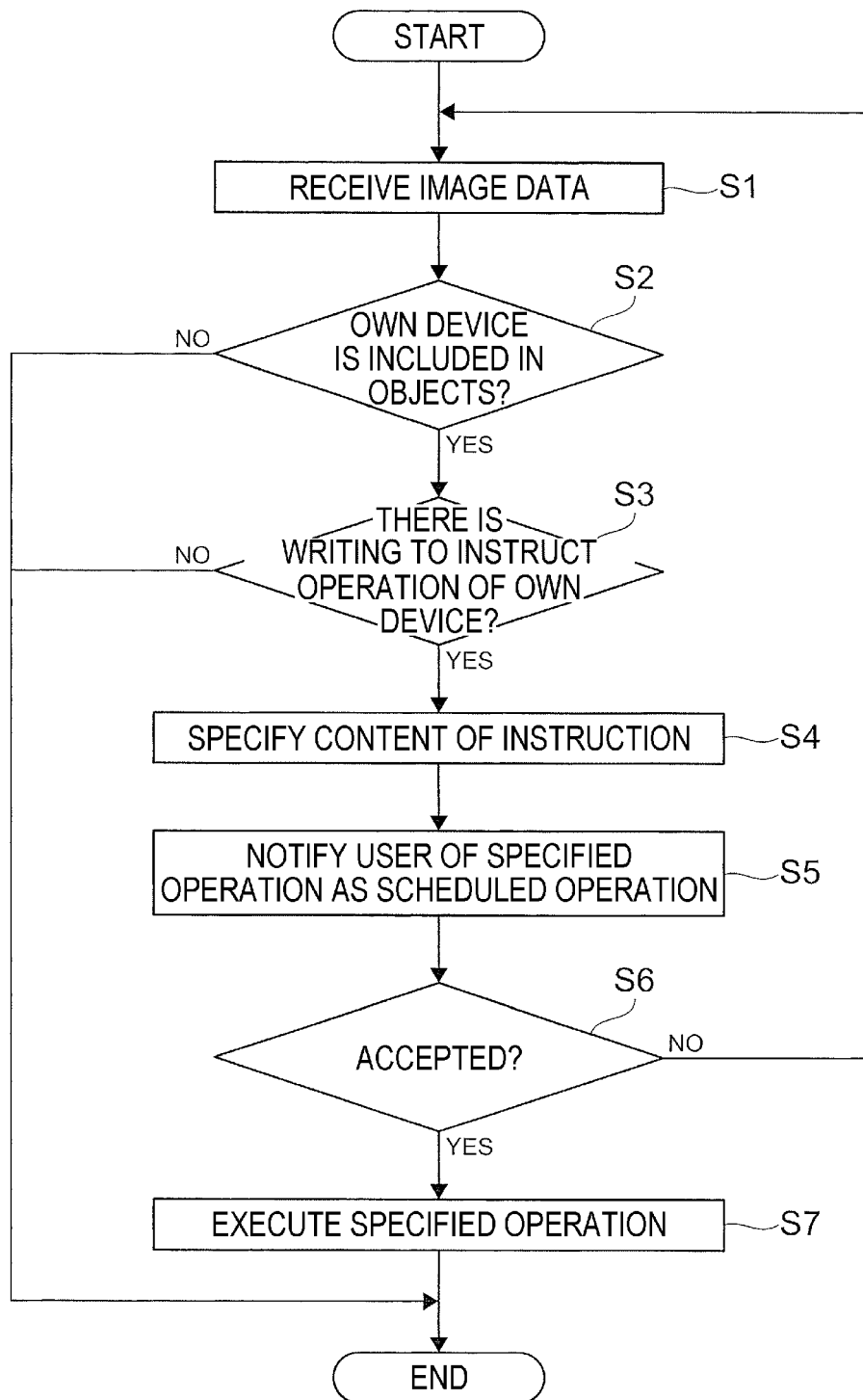
FIG. 6 is a flowchart of a processing operation executed by the cleaning robot used in the first exemplary embodiment.

FIG. 6 is a flowchart of the processing operation executed by the cleaning robot 158 used in the first exemplary embodiment.

First, the controller 201 (see FIG. 2) receives image data corresponding to the still image 111 (see FIG. 1) or the photograph 120 (see FIG. 1) through the image receiving unit 211 (see FIG. 2) (Step 1).

Next, the controller 201 determines whether its own apparatus is included in the objects of the electronic photograph corresponding to the image data through a function of the image recognition unit 212 (see FIG. 2) (Step 2). For this determination, the image recognition technology is used. One or plural pieces of image data of its own apparatus necessary for image recognition are stored in the storage unit 202 (see FIG. 2) or the like. In particular, the image data of its own apparatus may not be stored in the storage unit 202 or the like, and the image data acquired from the surveillance camera 157 (see FIG. 1) may be used.

When an affirmative result is obtained in Step 2, the controller 201 determines whether there is writing to instruct the operation of its own apparatus (Step 3). Here, when there is a pattern such as a curve represented by one stroke or a figure drawn with a single color in the image data, the controller 201 determines that there is writing to instruct the operation. For example, the trajectory 309 (see FIG. 4) and the enclosing line 313 (see FIG. 5) are examples of the pattern such as a stroke or a figure drawn with a single color. Conditions and patterns are registered in the storage unit 202 (see FIG. 2) which are necessary for determining whether writing is one to instruct the operation of the object.

Further, when the image of its own apparatus is included inside the region surrounded by the trajectory 309 (see FIG. 4) or the enclosing line 313 (see FIG. 5), the controller 201 recognizes that its own apparatus is a target of writing to instruct the operation of the object included in the image data.

When these two conditions are satisfied, the controller 201 determines that there is writing to instruct the operation of its own apparatus.

When a negative result is obtained in any of Step 2 and Step 3, the controller 201 terminates the process without executing an operation which will be described later.

On the other hand, when an affirmative result is obtained in Step 3, the controller 201 specifies the content of the instruction (Step 4). In the present exemplary embodiment, the controller 201 specifies the range to be cleaned.

Figure 7:
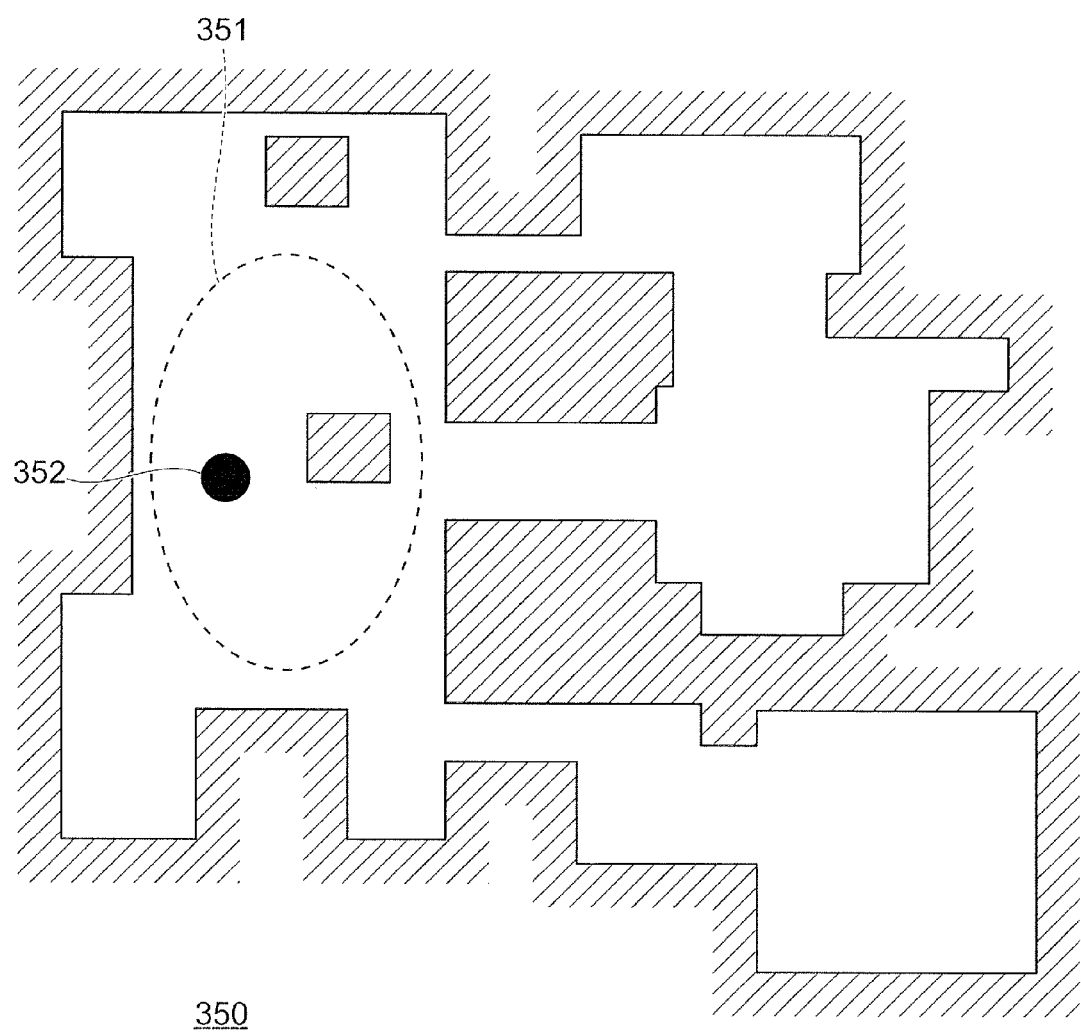
FIG. 7 is a view for explaining specification of a range to be cleaned.

FIG. 7 is a view for explaining specification of a range to be cleaned. FIG. 7 illustrates a relationship between a floor plan 350 which is generated by the cleaning robot 158 in advance and a cleaning range 351 (indicated by a broken line) specified by the controller 201. The cleaning range 351 corresponds to the trajectory 309 (see FIG. 4) or the enclosing line 313 (see FIG. 5).

Further, a symbol 352 indicated by a solid circle mark in the drawing indicates the current position of its own apparatus (that is, the cleaning robot 158 (see FIG. 1)), and shaded portions indicate a space to which the cleaning robot 158 cannot move due to an obstacle.

FIG. 6 is referred to again.

Next, the controller 201 notifies the user of the specified operation as a scheduled operation (Step 5). This notification is executed, for example, when image data is received from the computer 110 (see FIG. 1), and is not executed when image data is acquired from the photograph 120.

When executing Step 5, the controller 201 notifies the computer 110 of the content of the scheduled operation and waits for a response from the computer 110. Here, when receiving a response indicating that the scheduled operation is accepted (when an affirmative result is obtained in Step 6), the controller 201 executes the operation specified in Step 4 (Step 7). In the present exemplary embodiment, the cleaning is initiated for the specified range.

Further, when receiving a response indicating that the scheduled operation is not accepted (when a negative result is obtained in Step 6), the controller 201 returns to Step 1 and waits for an instruction of correct operation.

When not executing Step 5 (when not notifying the scheduled operation to the user), the controller 201 executes the specified operation (Step 7).

FIG. 8 is a view for explaining a specific example of cleaning by the cleaning robot 158. The cleaning robot 158 collects dust while traveling in the range 351 (inside the ellipse indicated by a broken line) that the user inputs by handwriting.

Effect of Exemplary Embodiment

According to the present exemplary embodiment, it is possible to instruct the cleaning robot 158 to specify the cleaning range (a range within a two-dimensional space) that is difficult to specify by operating buttons with the remote controller.

That is, the user may complete the instruction merely by drawing the trajectory 309 (see FIG. 4) or the enclosing line 313 (see FIG. 5) that specifies the range to be cleaned on the still image 111 or the photograph 120 and giving it to the trajectory 309 or the enclosing line 313 to the cleaning robot 158.

Further, when operating the moving direction of the cleaning robot 158 with the remote controller, the user needs to give instructions while monitoring the position of the cleaning robot 158 during the cleaning. However, in the present exemplary embodiment, the user completes the instruction only by initially giving an image.

In addition, the user may specify that the instructed object is the cleaning robot 158 merely by drawing a line that specifies the cleaning range so that the line includes the cleaning robot 158.

The cleaning robot 158 is an example of a specific device to be operated.

<Example of Other Instructions>

Hereinafter, another instruction method will be described.

Figure 9:
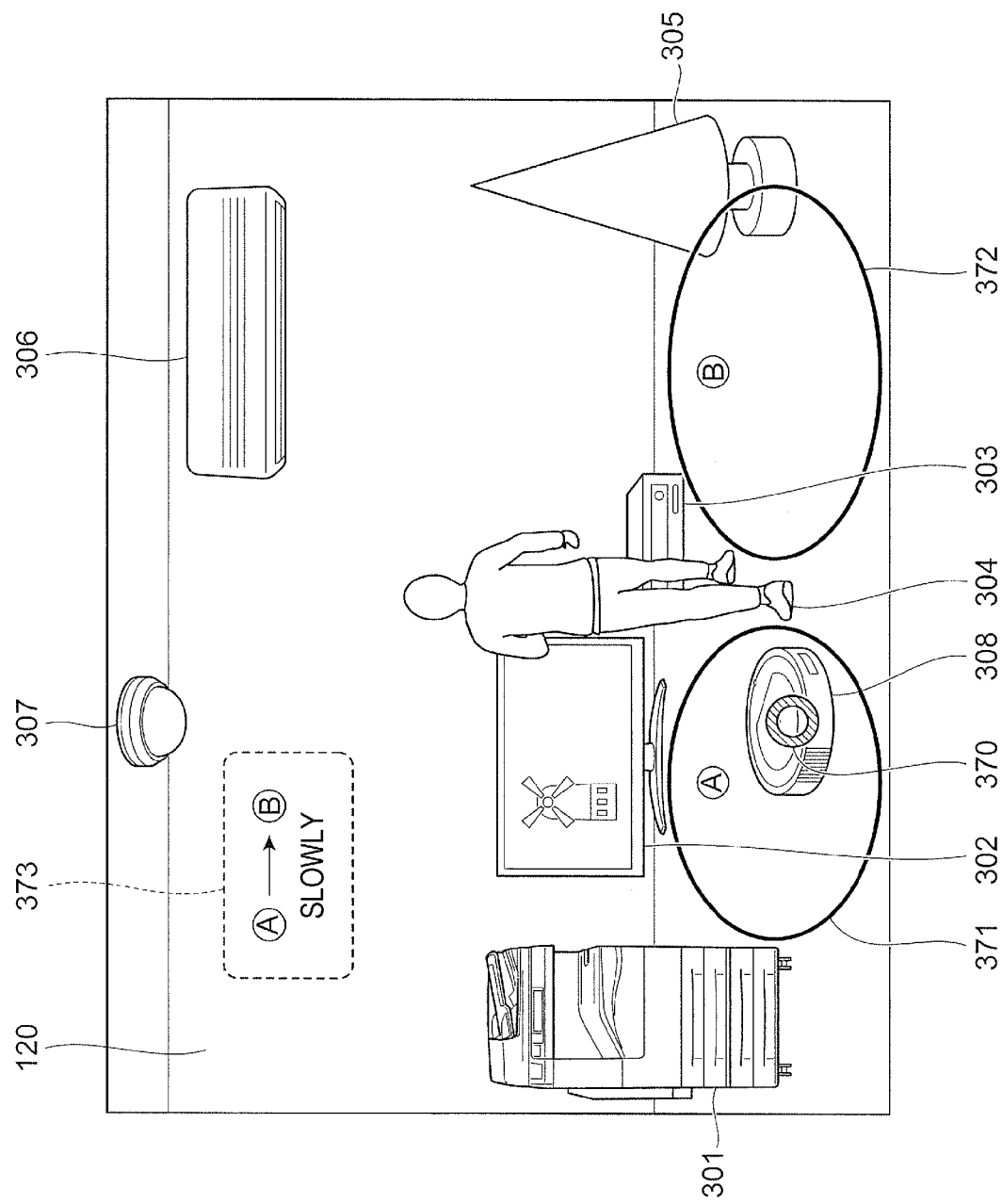
FIG. 9 is a view for explaining another example of designating the cleaning range using a photograph.

FIG. 9 is a view for explaining another example of designating the cleaning range using the photograph 120.

In the example of FIG. 9, a circle mark 370 is drawn on the image 308 of the cleaning robot, and the circle mark 370 indicates that the cleaning robot 158 (see FIG. 1) is an instruction target.

Further, in the example of FIG. 9, two figures 371 and 372 indicating the cleaning range are drawn. The elliptical figure 371 designates a space between the image 304 of the person and the image 301 of the image forming apparatus as the cleaning range. The elliptical figure 372 designates a space between the image 304 of the person and the image 305 of the planted tree as the cleaning range.

A symbol in which the letter A is surrounded by a circle is drawn inside the figure 371. A symbol in which the letter B is surrounded by a circle is drawn inside the figure 372.

Here, the letters A and B are surrounded by circles, so that the cleaning robot 158 can recognize that they are instructions from the user.

In FIG. 9, the controller 201 (see FIG. 3) operates under the rule that a letter surrounded by a circle is recognized as an instruction from the user. Therefore, when another predetermined rule exists, the user makes writing so as to satisfy the applicable rule. For example, rectangular figures and/or star figures may be combined with numbers.

Further, in the example of FIG. 9, a text 373 defining the cleaning quality (an example of the quality of the operation) is written in a blank space of the photograph 120. Specifically, the writing of "A (surrounded by a circle)→B (surrounded by a circle)" and the writing of "slowly" are found.

The writing of "A (surrounded by a circle)→B (surrounded by a circle)" instructs that the cleaning by the cleaning robot 158 may be initiated from the range enclosed by the figure 371 and may subsequently be executed within the range enclosed by the figure 372.

The writing of "slowly" instructs a low speed mode as the moving speed of the cleaning robot 158. In addition, examples of the writing associated with the moving speed of the cleaning robot 158 include "at high speed," "carefully," and "simply". For example, "at high speed" is used to instruct the high speed mode; "carefully" is used to instruct a mode for reducing remaining dust by, for example, enhancing suction power; and "simply" is used to perform cleaning by generating a standard suction force.

Figure 10:
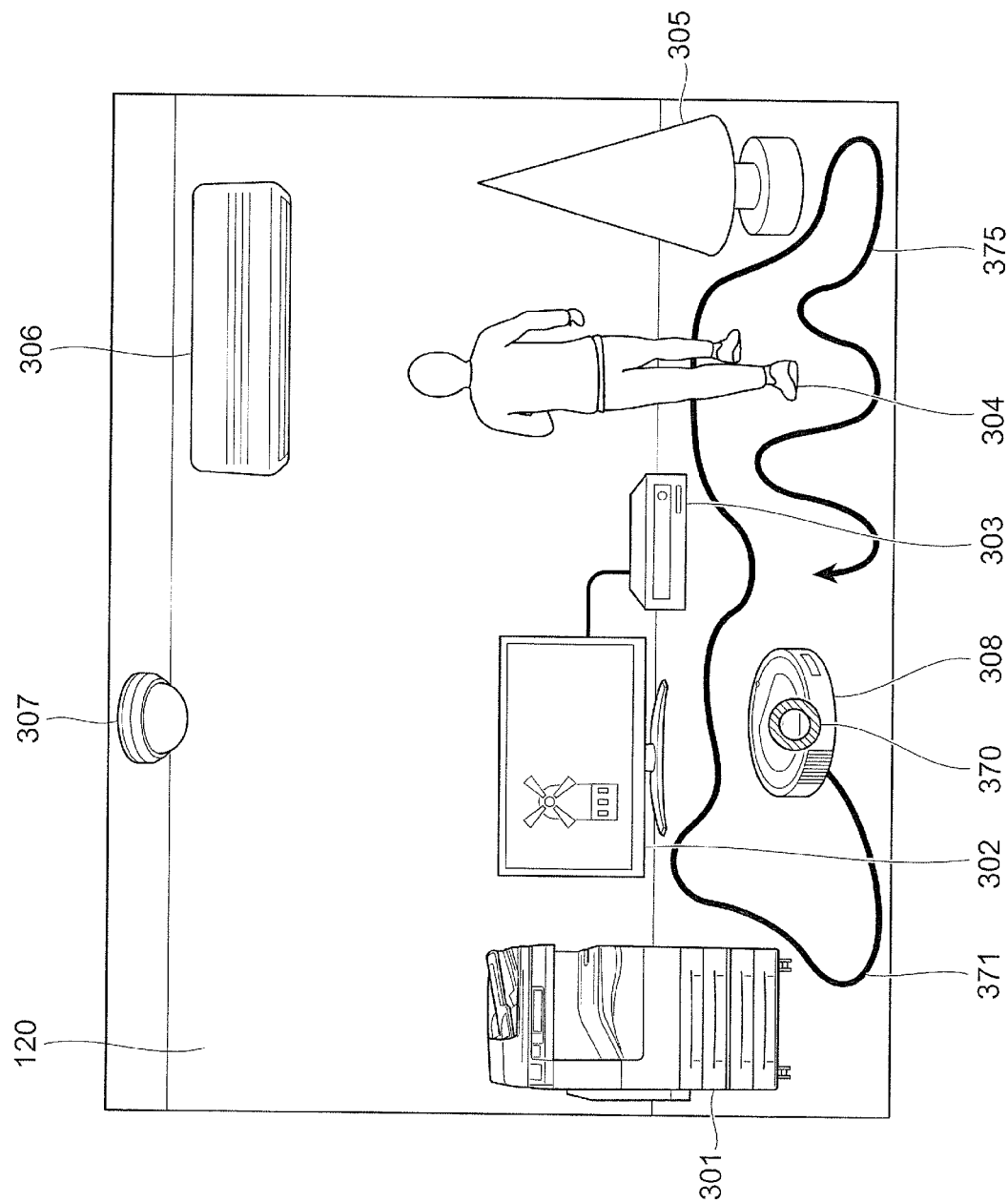
FIG. 10 is a view for explaining another example of designating the cleaning range using a photograph.

FIG. 10 is a view for explaining another example of designating the cleaning range using the photograph 120.

In FIG. 10 as well, the circle mark 370 is drawn on the image 308 of the cleaning robot 158 and the circle mark 370 indicates that the cleaning robot 158 (see FIG. 1) is an instruction target.

Meanwhile, in FIG. 10, a cleaning route is drawn with a single-stroke trajectory 375. In this case, the cleaning robot 158 moves in the real space 150 (see FIG. 1) along the instructed route.

Figure 11:
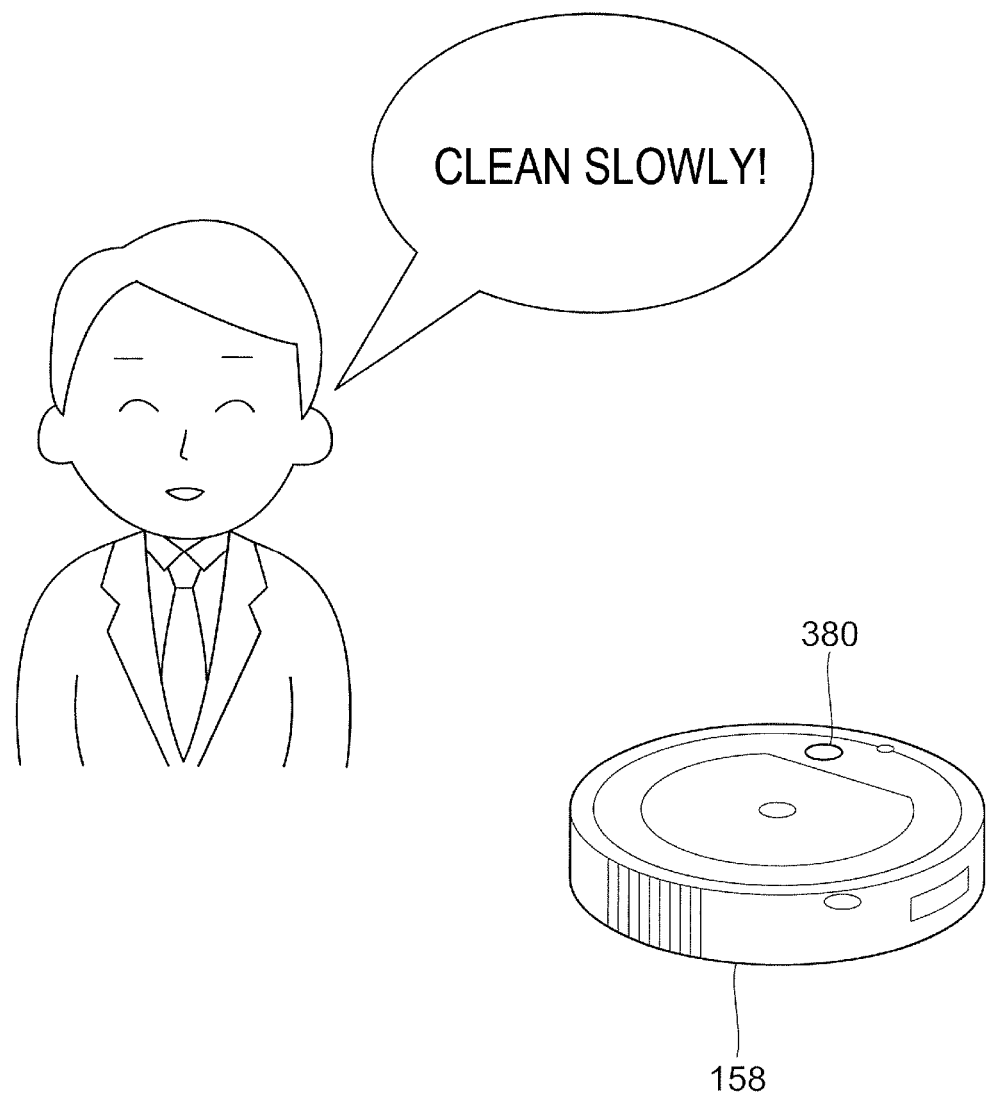
FIG. 11 is a view for explaining designation of a cleaning quality by voice.

FIG. 11 is a view for explaining the designation of the cleaning quality by voice.

This designation is a designation method that complements the above-describe instruction which is given using the image data. In FIG. 11, a man speaks to the cleaning robot 158, "Clean slowly." A microphone 380 is provided in the cleaning robot 158 illustrated in FIG. 11. Voice data corresponding to the voice acquired by the microphone 380 is voice-recognized and then given to the cleaning controller 214 (see FIG. 3).

As described above, by using auxiliary voice in combination, it is possible to complete all the contents of the instruction to the cleaning robot 158 without writing the contents on the image (electronic photograph), thereby simplifying the work required for the instruction.

Second Exemplary Embodiment

In a second exemplary embodiment, a description will be made of a case where an instruction target device is indirectly controlled through another device.

The configuration of an image processing system 400 according to the second exemplary embodiment will be described with reference to FIG. 12.

Figure 12:
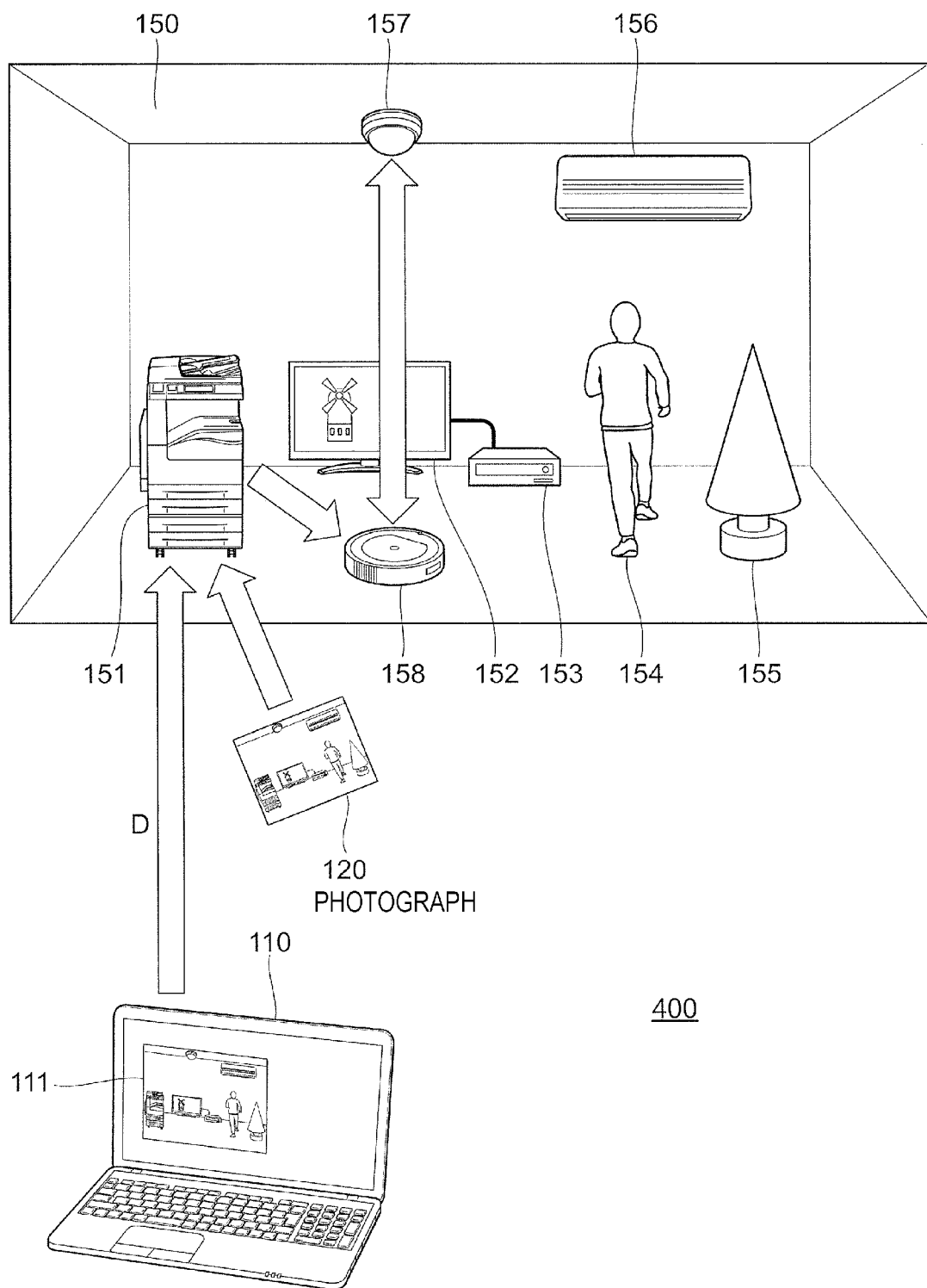
FIG. 12 is a view illustrating a configuration example of an image processing system according to a second exemplary embodiment.

FIG. 12 is a view illustrating a configuration example of the image processing system 400 according to the second exemplary embodiment.

In FIG. 12, portions corresponding to those in FIG. 1 are denoted by corresponding reference numerals.

Also, in the present exemplary embodiment, a target to be controlled is the cleaning robot 158.

In the present exemplary embodiment, it is assumed that the real space 150 appearing in the still image 111 is a private space and that information on other devices may be collected through, for example, a home network (in-home LAN) configured with devices existing in the home or an IoT network configured with IoT devices existing in the home.

The present exemplary embodiment is different from the first exemplary embodiment in that image data D or the photograph 120 is given to an image forming apparatus 151 and that the operation of the cleaning robot 158 is controlled by the image forming apparatus 151 that recognizes the instruction target.

Further, an instruction from the image forming apparatus 151 to the cleaning robot 158 is implemented through wireless communication.

Figure 13:
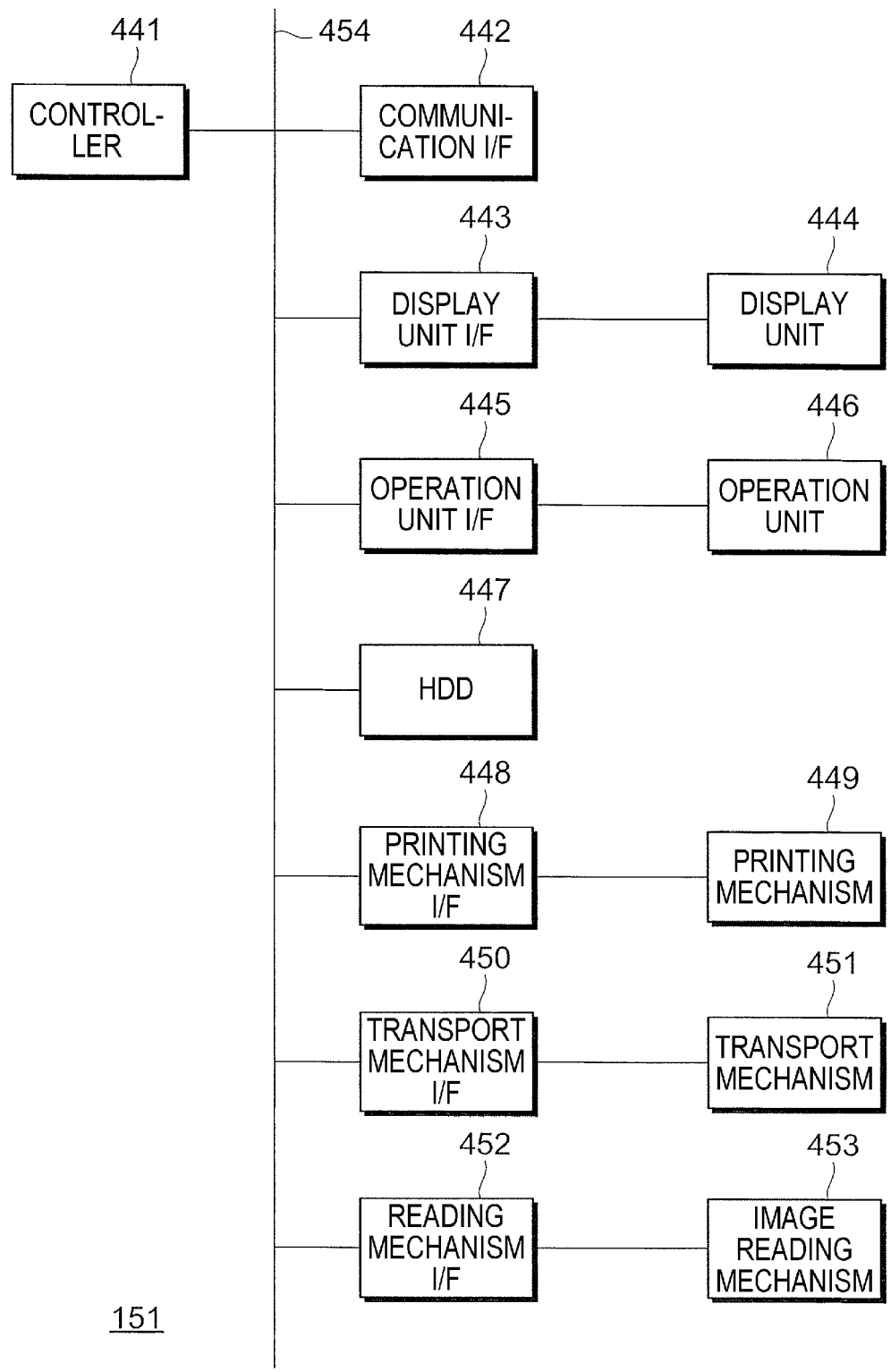
FIG. 13 is a block diagram illustrating an example of a hardware configuration of an image forming apparatus.

FIG. 13 is a block diagram illustrating an example of a hardware configuration of the image forming apparatus 151.

The image forming apparatus 151 includes a controller 441, a communication interface (communication I/F) 442 used for communication with the outside, a display unit interface (display unit I/F) 443 that displays an operation screen and the like on a display unit 444, and an operation unit interface (operation unit I/F) 445 that receives a user's operation on the operation unit 446.

Here, the display unit 444 is configured with, for example, a liquid crystal display, an organic EL display, or the like. The operation unit 446 is configured with, for example, operation buttons, operation keys, a touch panel, and the like.

The image forming apparatus 151 includes: a hard disk device (HDD) 447 that is an example of a nonvolatile storage device; a printing mechanism interface (printing mechanism I/F) 448 that drives a printing mechanism 449 which prints an image by, for example, an electrophotographic process or an inkjet process; a transport mechanism interface 450 that drives a transport mechanism 451 that transports a sheet which is a recording material; and a reading mechanism interface (reading mechanism I/F) 452 that drives an image reading mechanism 453 which reads an image from the photograph 120 (see FIG. 12).

Here, the image reading mechanism 453 is a so-called scanner.

The printing mechanism 449 has printing units corresponding to four colors of yellow (Y), magenta (M), cyan (C), and black (K). Each printing unit of the electrophotographic process includes a photoconductor drum, a charging unit that charges the surface of the photoconductor drum, an exposure unit that irradiates the charged photoconductor drum with a laser beam to draw an image, a developing unit that develops the drawn image as a toner image, a transfer unit that transfers the toner image to a sheet P, and a fixing device that fixes the transferred toner image onto the sheet P. The controller 441 and each unit are connected to each other via a bus 454.

Figure 14:
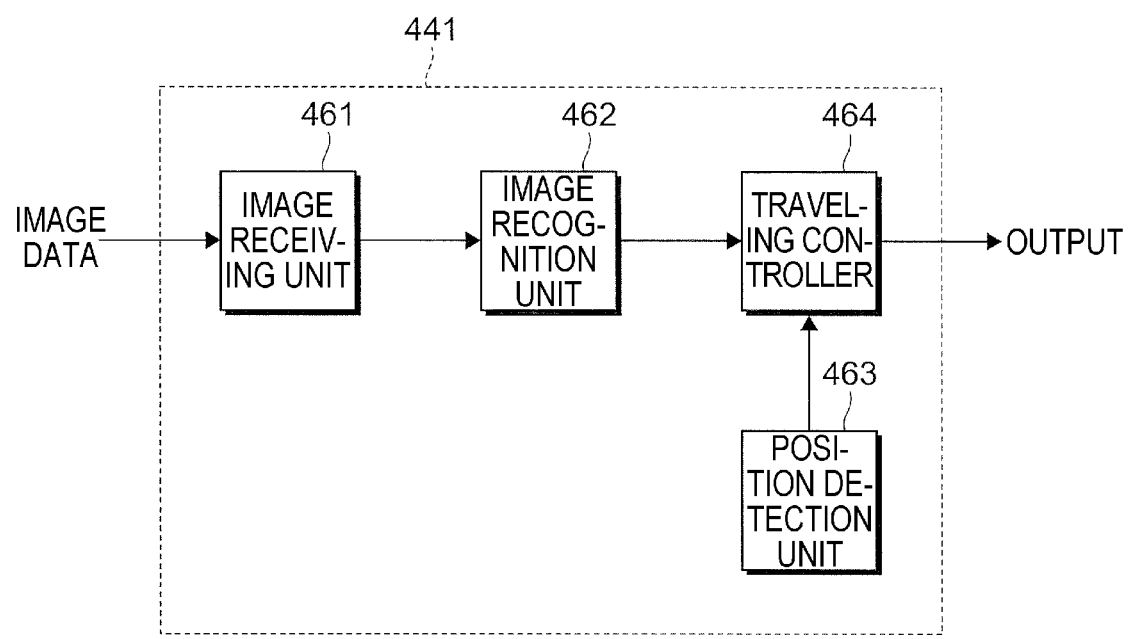
FIG. 14 is a view illustrating an example of a functional configuration of a controller constituting the image forming apparatus.

FIG. 14 is a view illustrating an example of the functional configuration of the controller 441 constituting the image forming apparatus 151 (see FIG. 1).

The controller 441 of the present exemplary embodiment includes an image receiving unit 461, an image recognition unit 462, a position detection unit 463, and a traveling controller 464. The image receiving unit 461 receives image data from the outside. The image recognition unit 462 recognizes information (writing to instruct the operation) included in the received image. The position detection unit 463 detects a position of the cleaning robot 158 (see FIG. 12) to be controlled in the real space 150. The traveling controller 464 controls traveling of the cleaning robot 158 based on the recognized information related to the instruction and the position of the cleaning robot 158.

Here, the image receiving unit 461 is an example of a receiver. The image recognition unit 462, the position detection unit 463, and the cleaning controller 464 are an example of a controller.

The traveling controller 464 also has a function of controlling the quality of the cleaning performed by the cleaning robot 158.

In the present exemplary embodiment, the image receiving unit 461 outputs, to the image recognition unit 462, the image data of the photograph 120 (see FIG. 12) read by the image reading mechanism 453 (see FIG. 13) or image data of an image file corresponding to the photograph 120 received from the computer 110 (see FIG. 12) through the communication interface (communication I/F) 442 (see FIG. 13).

When writing to instruct the operation of a specific object included in the image data is included, the image recognition unit 462 recognizes the content of the instruction and outputs the recognized content to the traveling controller 464. In the present exemplary embodiment, the image recognition unit 462 also performs an operation of recognizing the specific object as an instruction target.

For example, when its own apparatus is included in an image (for example, an electronic photograph) corresponding to the image data and the image recognition unit 462 recognizes writing that defines a moving range such as a moving direction, route, and range of another device, the image recognition unit 462 outputs the recognized information to the traveling controller 464.

The image recognition unit 462 holds the image data of its own apparatus and other devices and may recognize whether the object which is the instruction target is its own apparatus or another device.

In addition, the image recognition unit 462 of the present exemplary embodiment acquires, in advance, information of communication addresses required for communication between the images of the other devices and the respective devices through communication (for example, IoT communication) with the surveillance camera 157 (see FIG. 12), the other devices in the real space 150, or the like.

Using this information, the image recognition unit 462 recognizes instruction information and a designated device based on a trajectory or an enclosing line written in the image (for example, the electronic photograph).

The position detection unit 463 detects the position of the instruction target device (in this case, the cleaning robot 158) through communication with the instruction target device. As described in the first exemplary embodiment, when the cleaning robot 158 has a function of generating a floor plan and a function of detecting the position of its own apparatus, the floor plan and the position of the cleaning robot 158 are acquired by IoT communication.

Further, the position detection unit 463 may receive, from the cleaning robot 158, the position information received by the receiving unit of the indoor GPS.

In addition, the position detection unit 463 may acquire an image in the real space 150 through the IoT communication with the surveillance camera 157 in the real space 150 and detect the position of the cleaning robot 158 by image recognition.

The traveling controller 464 compares the moving range recognized by the image recognition unit 462 with the position detected by the position detection unit 463 to determine the range, route, and direction of the cleaning to be executed by the cleaning robot 158 (see FIG. 12). The determination method is the same as that in the first exemplary embodiment.

Further, when the cleaning robot 158 has the function of generating a floor plan, the traveling controller 464 may notify the cleaning robot 158 of the coordinates defining the cleaning range. In this case, the cleaning robot 158 may perform cleaning using the coordinates on the floor plan possessed by its own apparatus and the information on the position detected by its own apparatus.

In addition, the traveling controller 464 may sequentially control the moving direction of the cleaning robot 158 so that the position of the cleaning robot 158 detected at its own apparatus side does not go beyond the cleaning range.

Next, an example of the processing operation executed by the image forming apparatus 151 (see FIG. 12) will be described with reference to FIG. 15.

Figure 15:
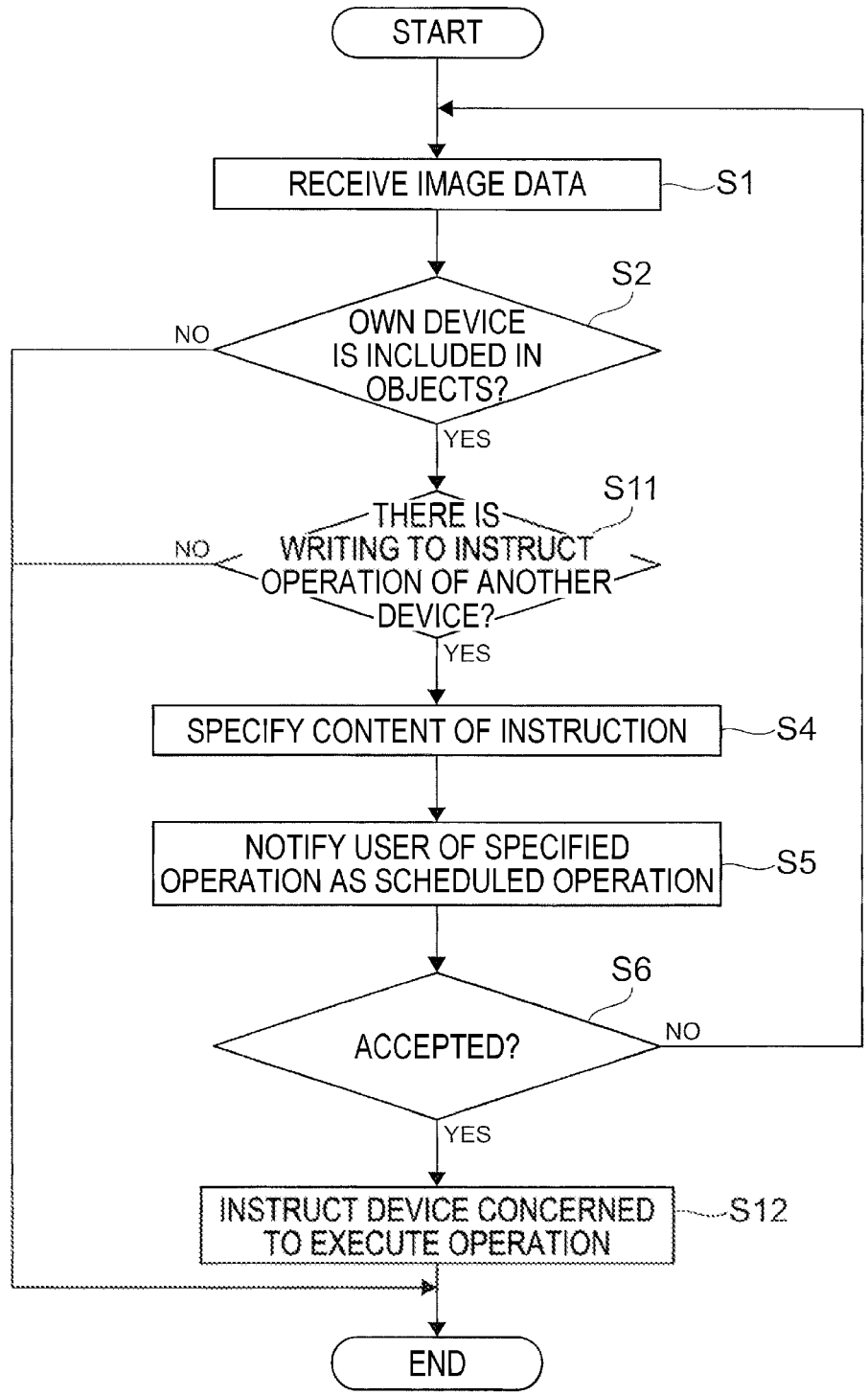
FIG. 15 is a flowchart of a processing operation executed by the image forming apparatus used in the second exemplary embodiment.

FIG. 15 is a flowchart of the processing operation executed by the image forming apparatus 151 used in the second exemplary embodiment. In FIG. 15, corresponding reference numerals are given to portions corresponding to those in FIG. 6.

First, the controller 441 (see FIG. 14) receives image data corresponding to the still image 111 (see FIG. 12) or the photograph 120 (see FIG. 12) through the image receiving unit 461 (see FIG. 14) (Step 1).

Next, the controller 441 determines, through the function of the image recognition unit 462 (see FIG. 14), whether its own apparatus is included in objects of the electronic photograph corresponding to the image data by image recognition (Step 2).

When an affirmative result is obtained in Step 2, the controller 441 determines whether there is writing to instruct the operation of another device (Step 11).

When a negative result is obtained in any of Step 2 and Step 11, the controller 441 terminates the process without executing an operation which will be described later.

On the other hand, when an affirmative result is obtained in Step 11, the controller 441 specifies the content of the instruction (Step 4). In the present exemplary embodiment, the controller 441 specifies the range to be cleaned.

Next, the controller 441 notifies the user of the specified operation as a scheduled operation (Step 5). This notification is executed, for example, when the image data is received from the computer 110 (see FIG. 12), and is not executed when the image data is acquired from the photograph 120.

When executing Step 5, the controller 441 notifies the computer 110 of the content of scheduled operation (scheduled operation) and waits for a response from the computer 110. Here, when receiving a response indicating that the scheduled operation is accepted (when an affirmative result is obtained in Step 6), the controller 441 instructs the device concerned (for example, the cleaning robot 158) to perform the operation specified in Step 4 (Step 12).

Further, when receiving a response indicating that the scheduled operation is not accepted (when a negative result is obtained in Step 6), the controller 441 returns to Step 1 and waits for an instruction of a correct operation.

When not executing the notification of Step 5, the controller 441 instructs the device concerned to execute the operation (Step 12).

According to the present exemplary embodiment, even when an application which operates based on the image data is not installed in the cleaning robot 158, the operation of the cleaning robot 158 may be controlled through communication from the image forming apparatus 151 to the cleaning robot 158.

Third Exemplary Embodiment

In the above exemplary embodiments, the description has been made of the case where the application for controlling the operation of its own apparatus or another device by processing the information written on the photograph 120 (see FIG. 5) or in the image data D corresponding to the photograph 120 is installed in advance.

In a third exemplary embodiment, a description will be made of a case where information defining a series of the workflow processes described above is provided to each device as attribute information of the image data D. Here, it is assumed that the user writes the cleaning range and the like on the surface of the still image 111 (see FIG. 5) corresponding to the image data D as in the first exemplary embodiment.

It is also assumed that the image data D used in the present exemplary embodiment is a JPEG file in compliance with the JPEG format for the sake of convenience. It should be noted that the image data D may be an image file in compliance with another image format.

Figure 16:
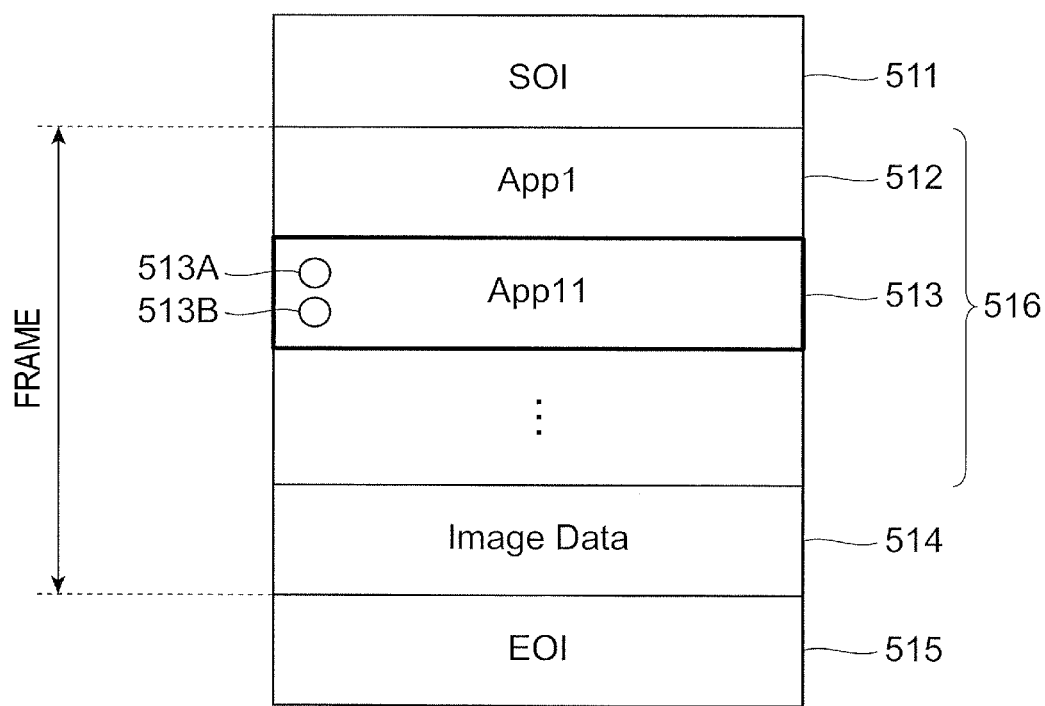
FIG. 16 is a view illustrating a data structure of a JPEG file used in a third exemplary embodiment.

FIG. 16 is a view illustrating a data structure of a JPEG file 500 used in the present exemplary embodiment. The JPEG file 500 is an example of the image file in compliance with the JPEG format.

The JPEG file 500 includes: a start of image segment (SOI) 511 indicating a start position of an image; an application type 1 segment (App1) 512 used in writing of Exif information or the like (App1); an application type 11 segment (App11) 513 used in writing of information that defines a workflow process related to an object; image data (ID) 514; and an end of image segment (EOI) 515 indicating an end position of the image.

Here, the main body of a still image is stored in the image data 514.

A region interposed between the start of image segment 511 and the end of image segment 515 is also referred to as a frame.

Although not illustrated in FIG. 16, the JPEG file also includes two segments (not illustrated), that is, a define quantization table segment (DQT) and a define Huffman table segment (DHT). Segments other than these are provided as required.

The application type 1 segment 512 and the application type 11 segment 513 are portions of attribute information 516 of the JPEG file 500.

In the application segment 513, information 513A and information 513B are written which define a workflow process related to an object included in a still image for which the JPEG file 500 is created. For example, the information 513A corresponds to a workflow process 1 related to an object 1, and the information 513B corresponds to a workflow process 2 related to an object 2.

The number of pieces of information stored in the application type 11 segment 513 may be zero, one, or three or more. Hereinafter, when the information 513A and the information 513B are not distinguished from each other, they are simply referred to as information 513A.

For example, the two pieces of information 513A and 513B may be associated with a single object (hereinafter, referred to as an "object"). That is, plural pieces of information may be associated with a single object.

For example, the information 513A may be used for processing in a first language (for example, Japanese, for a first OS), and the information 513B may be used for processing in a second language (for example, English, for a second OS).

Individual workflow processes include, for example, storing, displaying, aggregating, transmitting, and acquiring of information on objects corresponding to the information 513A, and acquiring of information on the real space 150 (see FIG. 1).

The information on objects includes, for example, information held on a real device and an image obtained by capturing the real device or living thing in addition to information existing on the Internet.

Further, the individual workflow processes include, for example, displaying of an operation panel for controlling the operation of a real device corresponding to the object for which the information 513A is recorded, controlling of the operation of the real device which is determined in the information 513A in advance, acquiring of information from the real device corresponding to the object, and reflecting of an acquired real device state to an image.

In addition, for example, the both information 513A and 513B may be provided for each operation type of one device. For example, the information 513A may be used to operate the channel of a television receiver, and the information 513B may be used to operate the power button of the television receiver.

For example, the information 513A is written in the form of text data. In the present exemplary embodiment, a Java Script Object Notation (JSON), which is an example of a data exchange format, is used to write the information 513A. The JSON (registered trademark) is a language that uses a portion of the object notation in JavaScript (registered trademark) as a syntax base. Of course, the language used to write the workflow process is not limited to the JSON.

Here, a description will be made of a case where the image data D is given to the cleaning robot 158 (see FIG. 1) as in the first exemplary embodiment.

Figure 17:
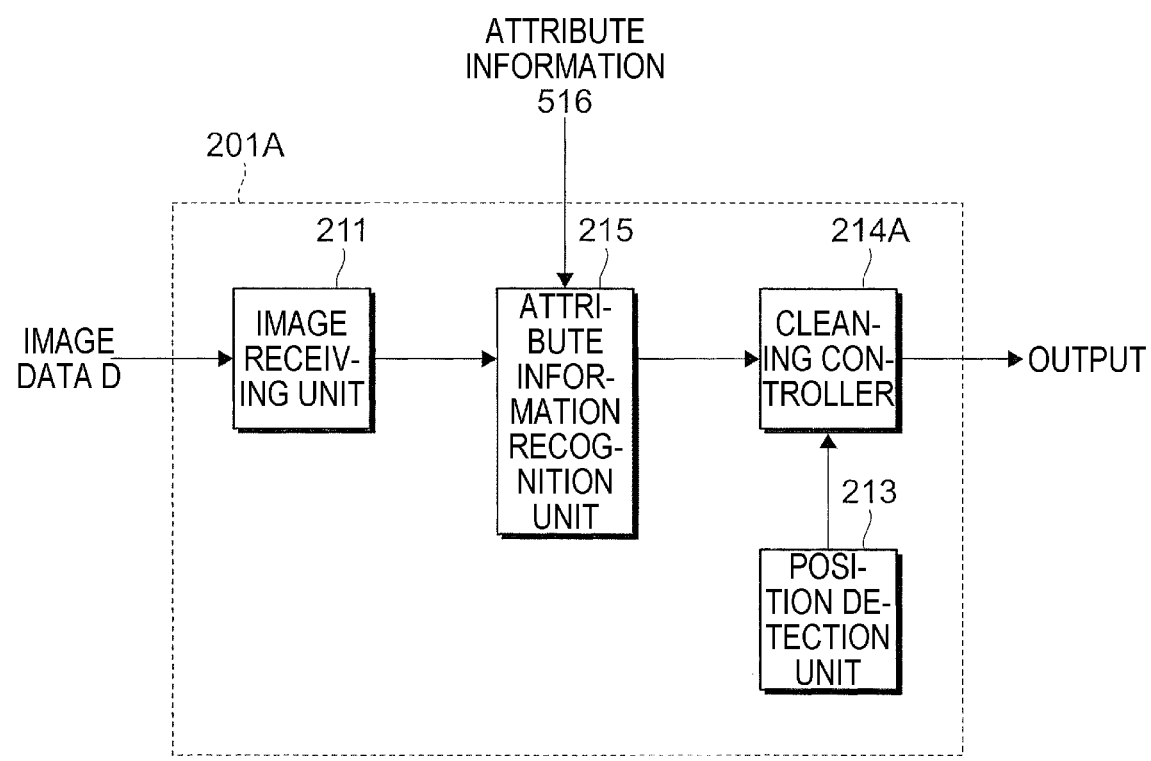
FIG. 17 is a view illustrating an example of a functional configuration of a controller constituting a cleaning robot according to the third exemplary embodiment.

FIG. 17 is a view illustrating an example of a functional configuration of a controller constituting the cleaning robot 158 according to the third exemplary embodiment.

In FIG. 17, portions corresponding to those in FIG. 3 are denoted by corresponding reference numerals.

The functional configuration illustrated in FIG. 17 is implemented through execution of firmware by a controller 201A. The function required for the firmware is a function of reading and executing the information 513 (see FIG. 16) that defines the workflow process from the attribute information 516 (see FIG. 16) of the image data D.

The controller 201A of the present exemplary embodiment includes: an image receiving unit 211 that receives the image data D from the outside; an attribute information recognition unit 215 that reads the attribute information 516 of the received image data D and recognizes the information 513A (see FIG. 16) associated with each device included as an object; a position detection unit 213 that detects a position of its own apparatus in the real space 150; and a cleaning controller 214A that controls the traveling of its own apparatus through execution of the workflow process written in the recognized information 513A.

Here, when recognizing that the image (object) of its own apparatus is included in the image data D using the image recognition technology, the cleaning controller 214A determines whether the information 513A corresponding to the image (object) of its own apparatus is included in the attribute information 516. When the information 513A is included in the attribute information 516, the cleaning controller 214A controls the movement of its own apparatus according to the activated workflow process.

Figure 18:
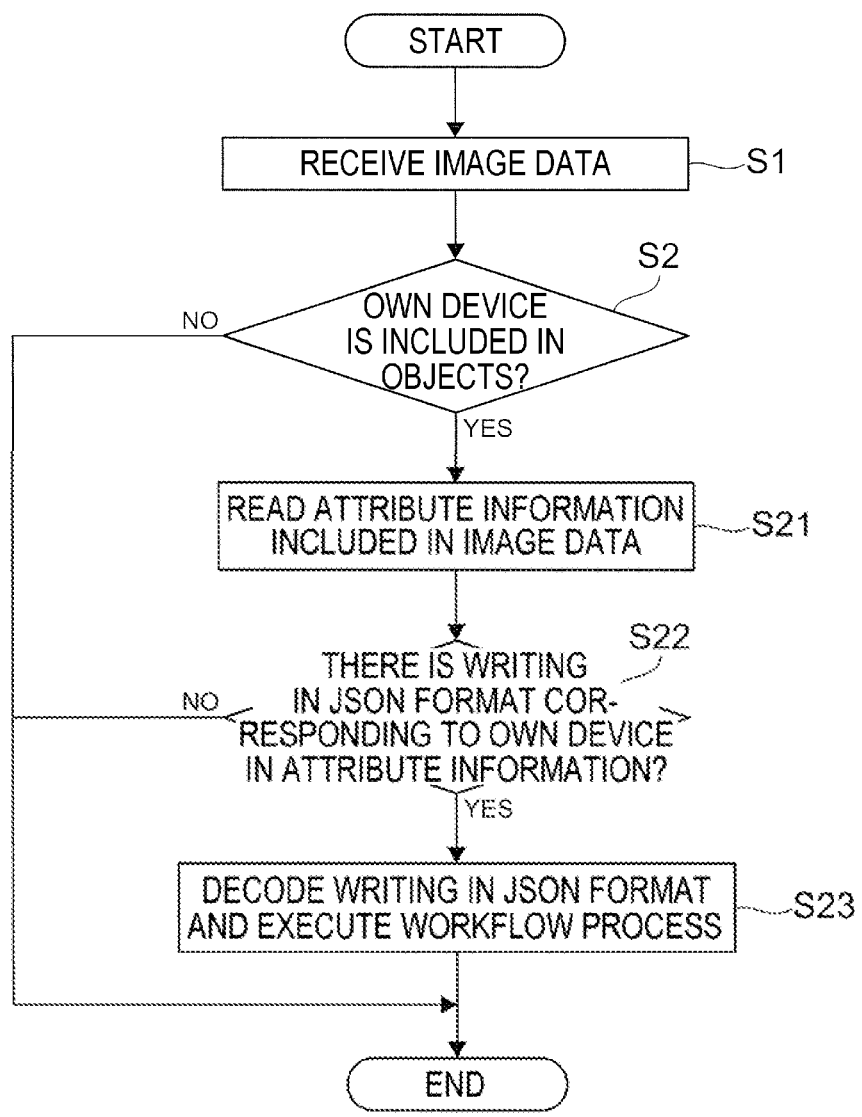
FIG. 18 is a flowchart of an example of a processing operation executed by the controller according to the third exemplary embodiment.

FIG. 18 is a flowchart of an example of a processing operation executed by the controller 201A (see FIG. 17) according to the third exemplary embodiment.

In FIG. 18, portions corresponding to those in FIG. 6 are denoted by corresponding reference numerals. First, the controller 201A receives the image data D through the image receiving unit 211 (Step 1).

Next, the controller 201A determines, through the function of the attribute information recognition unit 215, whether its own apparatus is included in objects of an electronic photograph corresponding to the image data by image recognition (Step 2). One or plural pieces of image data of its own apparatus necessary for image recognition are stored in the storage unit 202 (see FIG. 2) or the like. The controller 201A may not have the image data of its own apparatus in the storage unit 202 or the like, and may compare the image data of its own apparatus with the image data acquired from the surveillance camera 157 (see FIG. 1).

When an affirmative result is obtained in Step 2, the controller 201A reads the attribute information 516 included in the image data D (Step 21).

Subsequently, the controller 201A determines whether there is writing in the JSON format corresponding to its own apparatus in the attribute information 516 (Step 22).

When an affirmative result is obtained in Step 22, the controller 201A decodes the writing in the JSON format and executes the workflow process (Step 23).

As the workflow process, the same process as that in the first exemplary embodiment is executed. That is, it is determined whether information designating the range to be cleaned by its own apparatus or the like is written on the surface of the still image 111 (see FIG. 5) corresponding to the image data D, and when it is determined that such information is written, the designated range is cleaned.

When a negative result is obtained in any of Step 2 and Step 22, the controller 201A terminates the process without executing an operation which will be described later.

This operation is premised on that the information 513A associated with a specific object is recorded in a portion of the attribute information 516 (see FIG. 16) of the image data D. Hereinafter, a processing function for recording the information 513A in the attribute information 516 of the JPEG file 500 (see FIG. 16) will be described.

Figure 19:
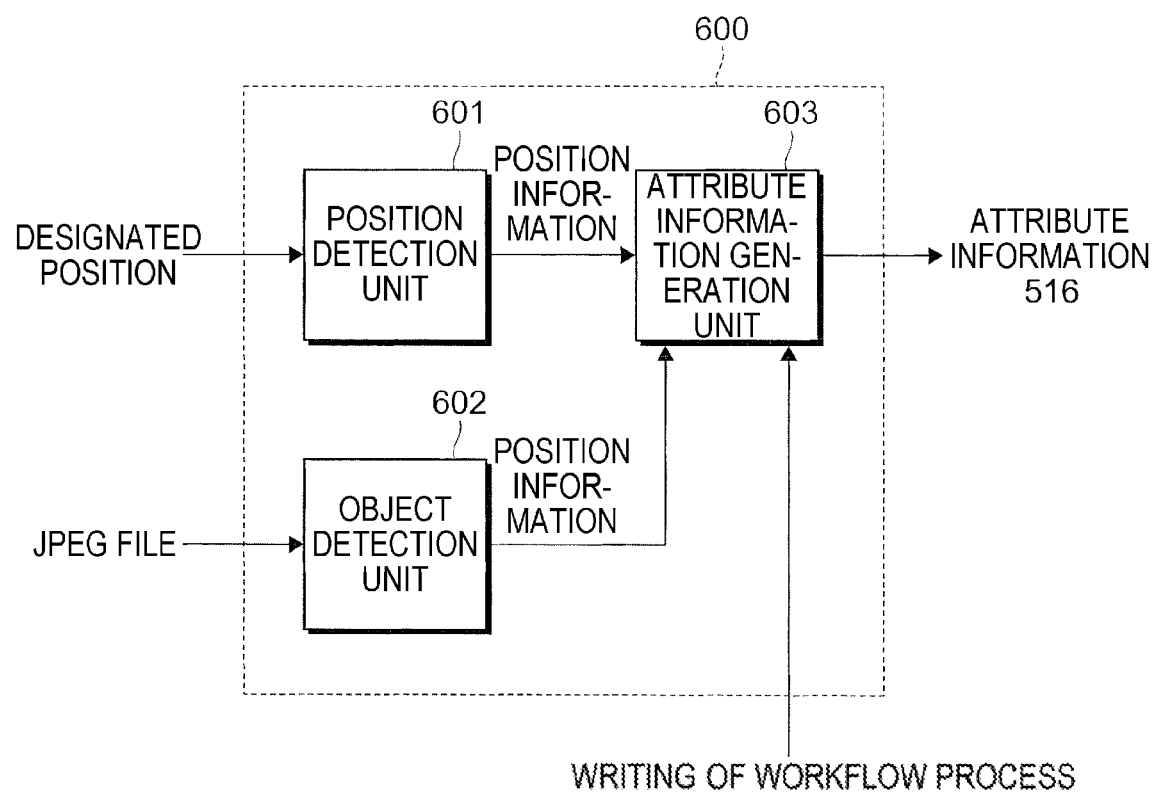
FIG. 19 is a block diagram illustrating an example of a functional configuration of the controller constituting the information processing apparatus used to record information that defines a workflow process.

FIG. 19 is a block diagram illustrating an example of a functional configuration of a controller 600 constituting the information processing apparatus (for example, computer 110) used for recording the information 513A (see FIG. 16) that defines the workflow process.

Here, the controller 600 functions as a position detection unit 601 that detects a region of an object designated by a user, an object detection unit 602 that detects a region of an image to be recorded as an object using the image processing technology from the image data 514 (see FIG. 16) of the JPEG file 500 (see FIG. 16), and an attribute information generation unit 603 that generates the attribute information 516 in association with the writing of the workflow processes to be associated with respective detected regions.

Figure 20:
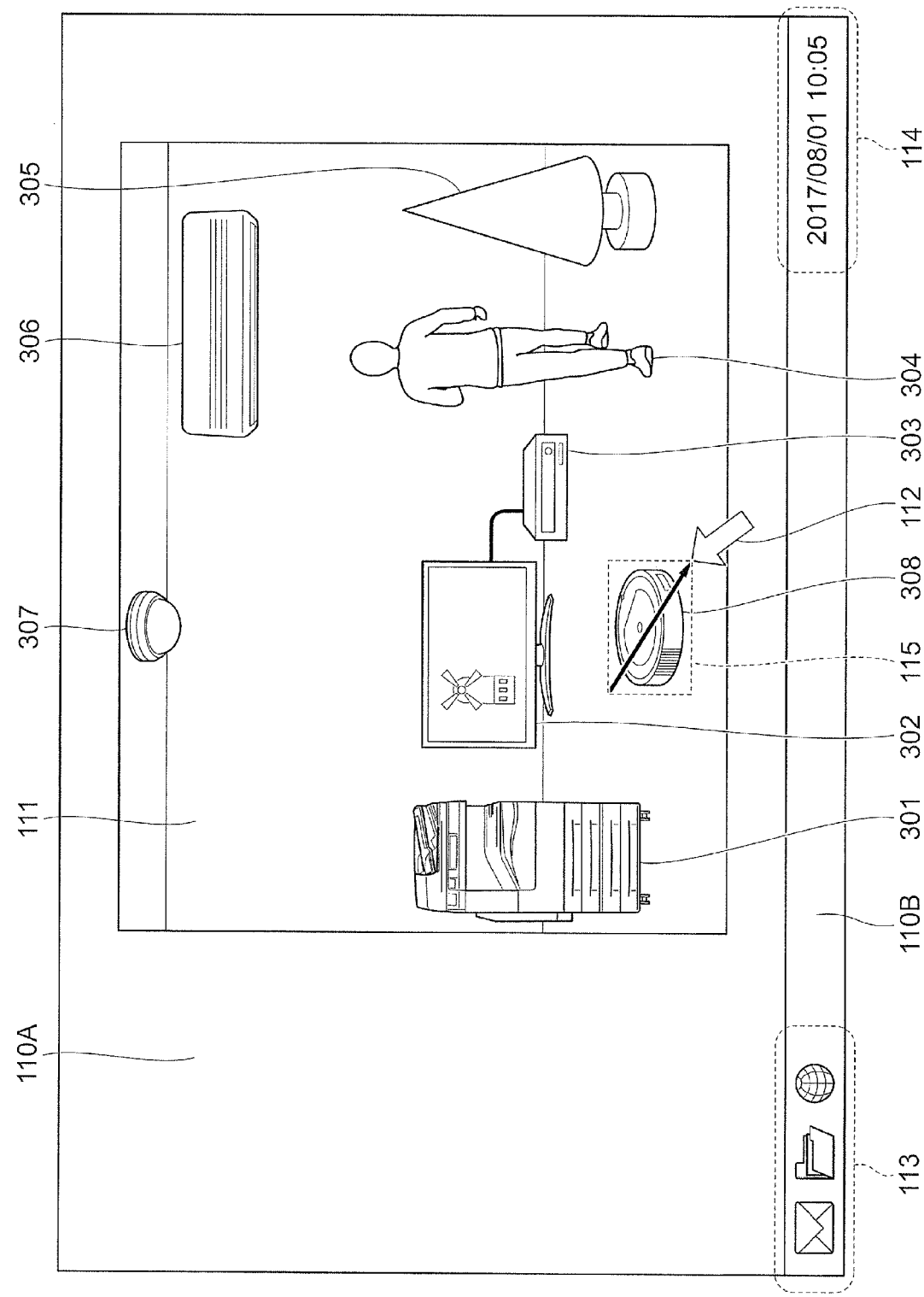
FIG. 20 is a view for explaining designation of an object region by a user.

FIG. 20 is a view for explaining an example of designation of a region of an object by a user. In FIG. 20, by dragging the mouse pointer 112, a region 115 is set so as to surround the display region of the image 308 of the cleaning robot, which is one of the images in the still image 111, with a broken line.

FIG. 19 is referred to again.

As coordinate information defining this region 115 (see FIG. 20), the position detection unit 601 outputs, for example, the coordinate values of the upper left corner, which is the starting point of the dragging, and the number of pixels by which the mouse 112 is moved in the vertical direction until the end of the dragging and the number of pixels by which the mouse 112 is moved in the horizontal direction until the end of the dragging.

The object detection unit 602 is used when an image (registered image) of an image for which the information 513A (see FIG. 16) is recorded, is registered in advance.

The object detection unit 602 executes a matching process between the registered image and the image data 514 (see FIG. 16) included in the JPEG file 500 (see FIG. 16), and outputs coordinate information that specifies a region where the image (object) matching the registered image exists as position information.

The attribute information generation unit 603 executes a process of associating writing of the workflow process input through another screen or prepared in advance with each position information. Also, in this exemplary embodiment, the workflow process is written in the JSON format.

Further, in the case where articles in the real space corresponding to the images are devices, the serial number that specifies each device through the IoT network and the address information on the IoT network is collected at the time of capturing the still image 111 and associated with the still image 111, thereby it is possible to eliminate the labor of manually inputting the serial number and the like of each device.

In addition, as described in the first exemplary embodiment, an article in the real space associated with each image does not need to be a real article corresponding to each image.

Figure 21A:
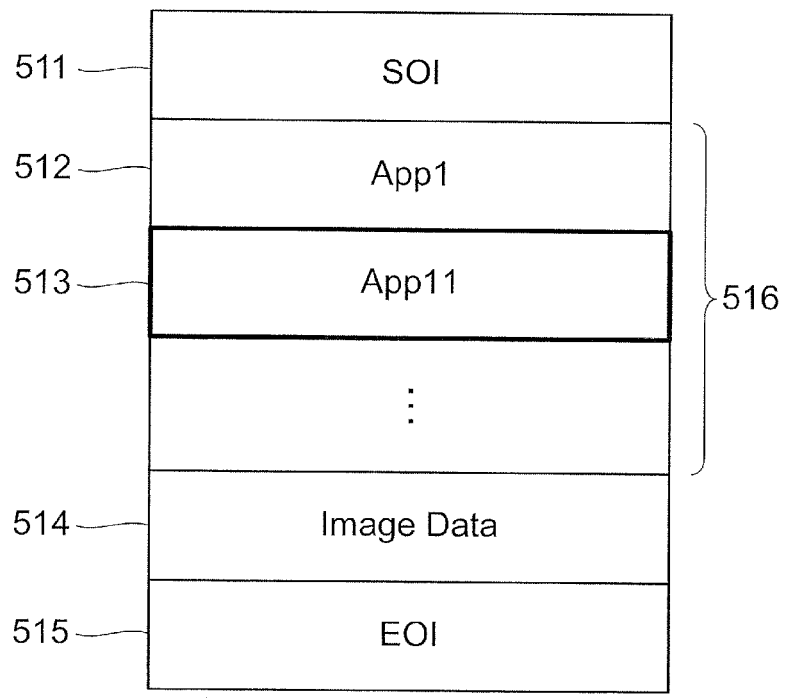
FIGS. 21A and 21B are views for explaining recording of information that defines the workflow process in attribute information.
Figure 21B:
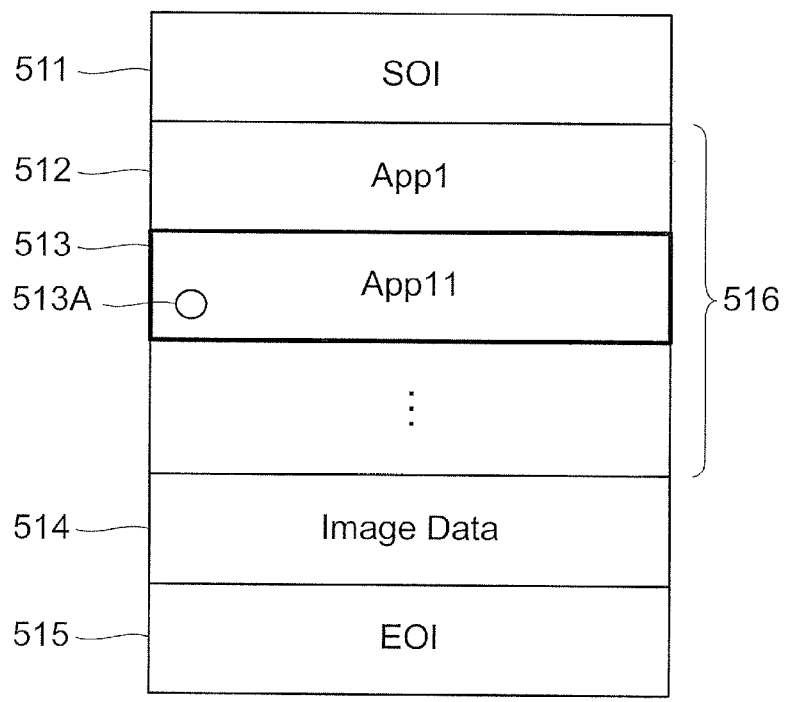

FIGS. 21A and 21B are views for explaining the writing of the information 513A defining the workflow process into the attribute information 516. FIG. 21A illustrates the data structure before the information 513A is included in the attribute information 516 of the JPEG file 500. FIG. 21B illustrates a state in which the information 513A is added to the attribute information 516 of the JPEG file 500.

In this way, the information 513A defining the workflow process may be added to the existing JPEG file 500 later.

In the meantime, a user may input the contents of the workflow process to be written in the information 513A, one piece by one piece. Alternatively, a technique of giving the contents according to the designated image by the attribute information generation unit 603 (see FIG. 19) or a technique of presenting the contents to the user may be adopted.

For example, the attribute information generation unit 603 may recognize an image designated through image processing or a type of the image, and may determine the workflow process to be written as the information 513A according to the recognized information. When the contents of the workflow process to be applied are substantially determined according to the image or the type of the image, the workload of the user may be reduced.

According to the present exemplary embodiment, even when an application program for reading and executing writing of the cleaning range drawn on the photograph 120 (see FIG. 1) presented to the cleaning robot 158 (see FIG. 1) or in the corresponding image data D is not installed, a control equivalent to that in the first exemplary embodiment may be implemented by providing a function of reading and executing the attribute information 516 (see FIG. 16) of the image data D.

That is, it is possible to easily instruct the cleaning robot 158 to clean the cleaning range that is difficult to designate by a method of designating the cleaning range through a remote controller or the like.

Further, in the present exemplary embodiment, since the user may designate the contents of the workflow process to be executed by the cleaning robot 158, it is easy to designate the operation to be executed by the cleaning robot 158.

<Other Operation Examples>

In the foregoing description, the image data D in which the information 513A (see FIG. 16) indicating the workflow process is written in the attribute information 516 (see FIG. 16) is directly given to the cleaning robot 158 (see FIG. 1) to be controlled. The foregoing description may also be applicable to a case where the cleaning robot 158 is indirectly controlled through another device as in the second exemplary embodiment.

Figure 22:
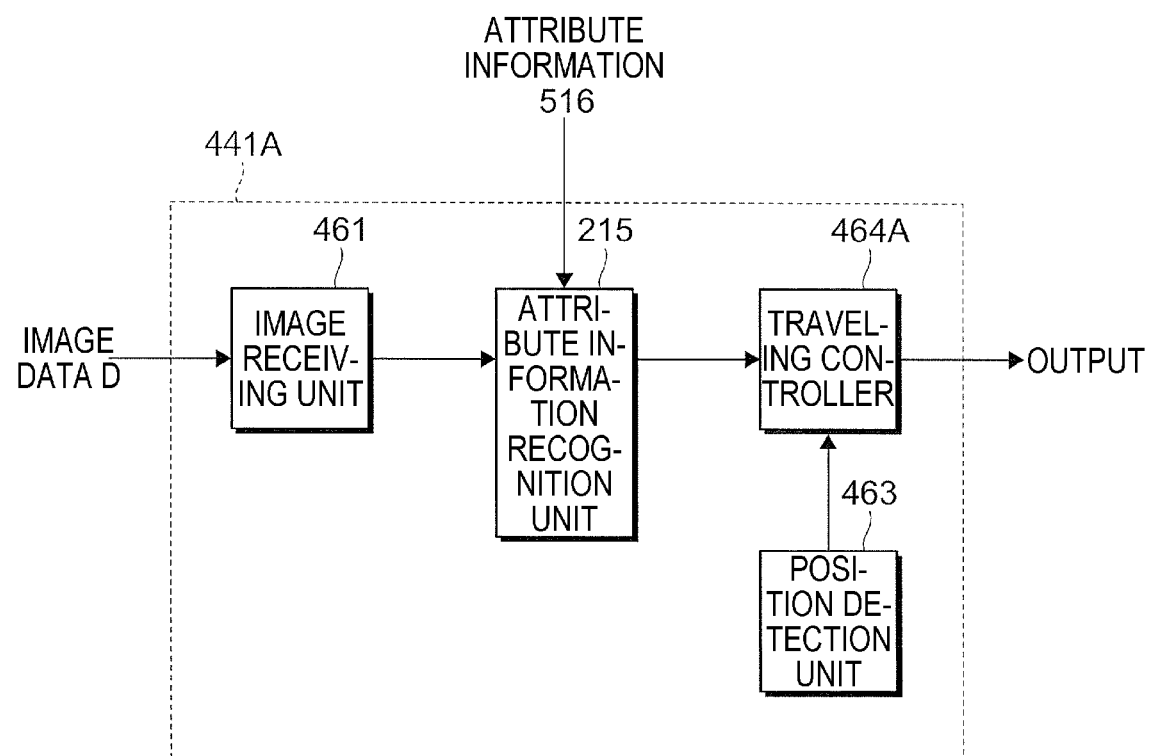
FIG. 22 is a view illustrating an example of a functional configuration of the controller constituting the image forming apparatus corresponding to control based on the attribute information.

FIG. 22 is a view illustrating an example of the functional configuration of a controller 441A constituting the image forming apparatus 151 (see FIG. 1) corresponding to the control based on the attribute information.

In FIG. 22, portions corresponding to those in FIGS. 14 and 17 are denoted by corresponding reference numerals.

The controller 441A includes: an image receiving unit 461 that receives image data D from the outside; an attribute information recognition unit 215 that reads the attribute information 516 (see FIG. 16) of the received image data D and recognizes the information 513A (see FIG. 16) associated with each device included as an object; a position detection unit 463 that detects a position of the cleaning robot 158 to be controlled in the real space 150 (see FIG. 12); and a traveling controller 464A that controls traveling of the cleaning robot 158 (see FIG. 12) based on the information on the recognized instruction and the position of the cleaning robot 158 (see FIG. 12).

Figure 23:
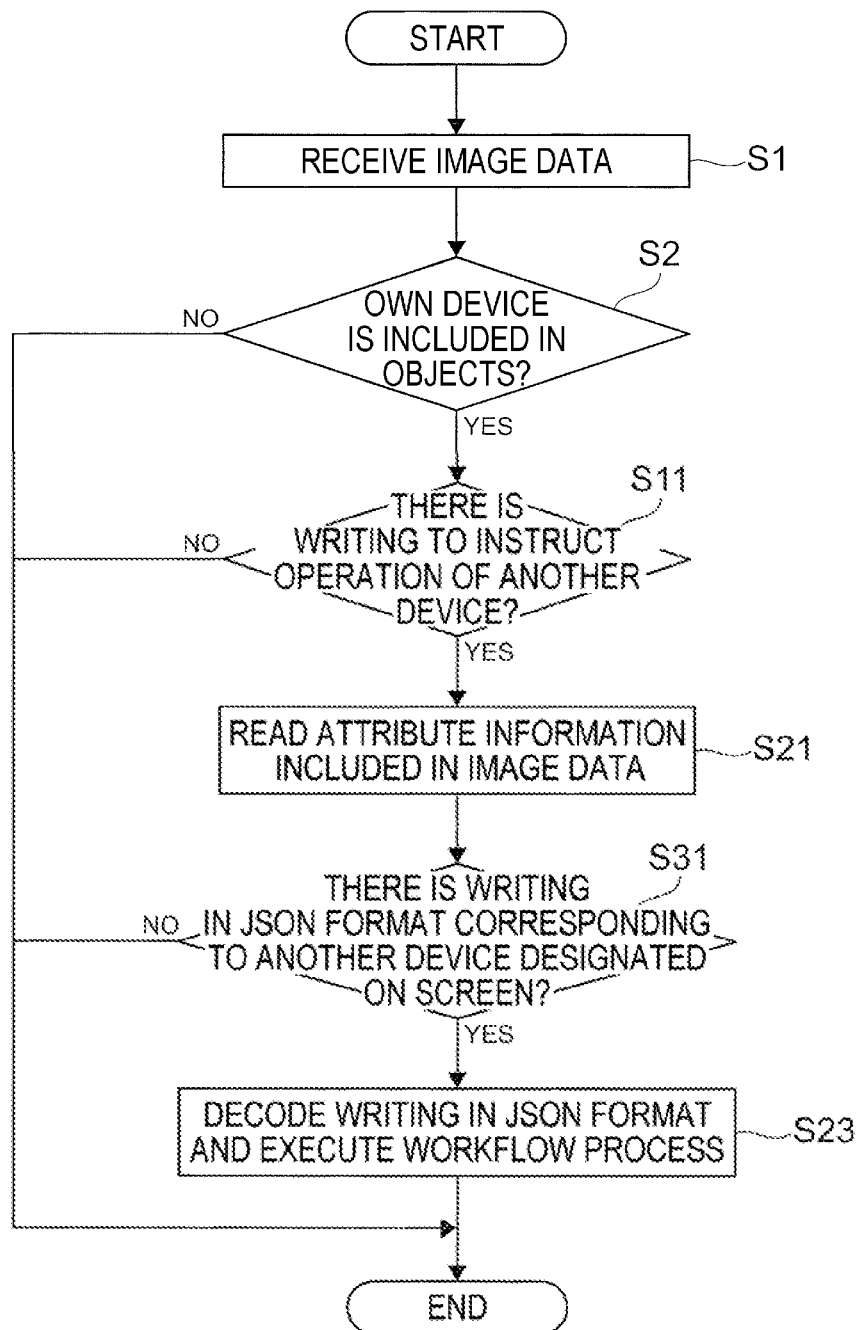
FIG. 23 is a flowchart of an example of a processing operation executed by the controller constituting the image forming apparatus.

FIG. 23 is a flowchart of an example of a processing operation executed by the controller 441A constituting the image forming apparatus 151 (see FIG. 1).

In FIG. 23, portions corresponding to those in FIG. 18 are denoted by corresponding reference numerals.

First, the controller 441A (see FIG. 22) receives the image data D through the image receiving unit 461 (see FIG. 22) (Step 1).

Next, the controller 441A determines, through the function of the attribute information recognition unit 215 (see FIG. 22), whether its own apparatus is included in objects of an electronic photograph corresponding to the image data by image recognition (Step 2).

When an affirmative result is obtained in Step 2, the controller 441A determines whether there is writing to instruct the operation of another device included in the objects (Step 11).

When an affirmative result is obtained in Step 11, the controller 441A reads the attribute information 516 (see FIG. 16) included in the image data D (Step 21).

Subsequently, the controller 441A determines whether there is writing in the JSON format corresponding to another device (for example, cleaning robot 158) designated on the screen in the attribute information 516 (Step 31).

When an affirmative result is obtained in Step 31, the controller 441A decodes the writing in the JSON format and executes the workflow process (Step 23).

Further, when a negative result is obtained in any of Steps 2, 11, and 31, the controller 441A terminates the process.

Other Exemplary Embodiments

Although the exemplary embodiments of the present invention have been described above, the technical scope of the present disclosure is not limited to the scope described in the above described exemplary embodiments. It is obvious from the description of the claims that various modifications or improvements for the above described exemplary embodiments are also included in the technical scope of the present invention.

For example, in the above exemplary embodiments, the description has been made of the case where the cleaning range of the cleaning robot 158 (see FIG. 1) is designated by writing the enclosing line 313 (see FIG. 5) on the photograph 120 (see FIG. 1) or the like. It should be noted that the control of the operations of the devices that is implemented using the photograph 120 or the like is not limited to the control of the movement of the cleaning robot 158.

Figure 24A:
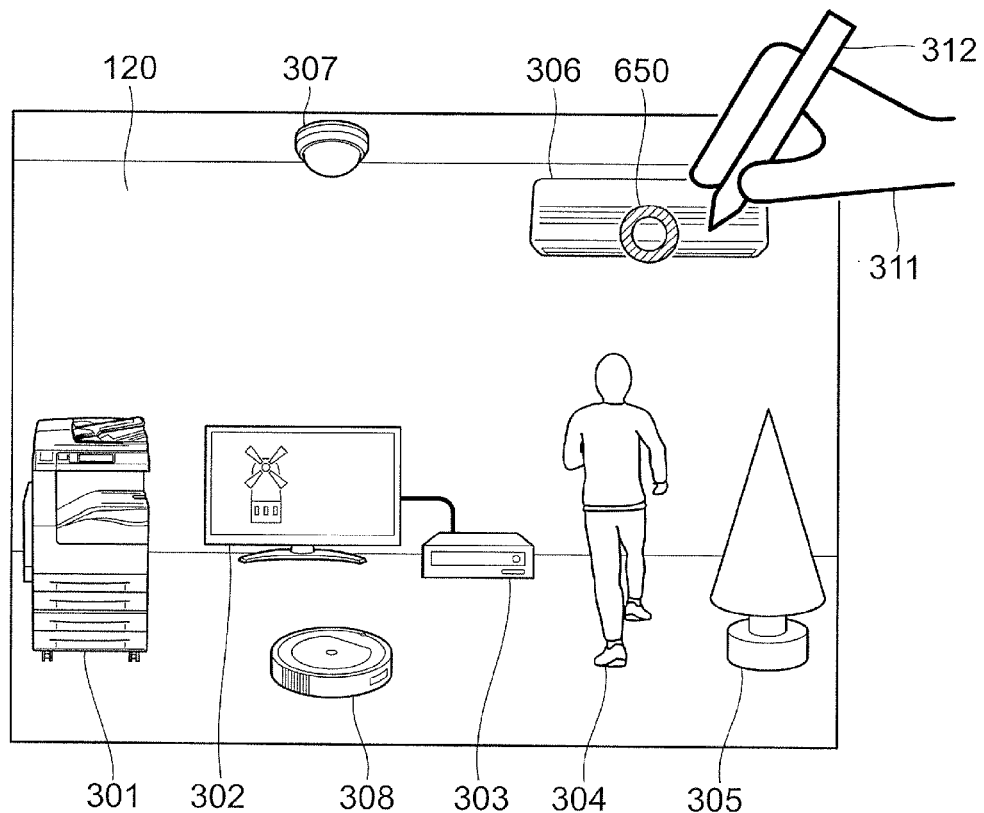
FIGS. 24A and 24B are views illustrating an example of controlling the operation of an air conditioner using a photograph.
Figure 24B:
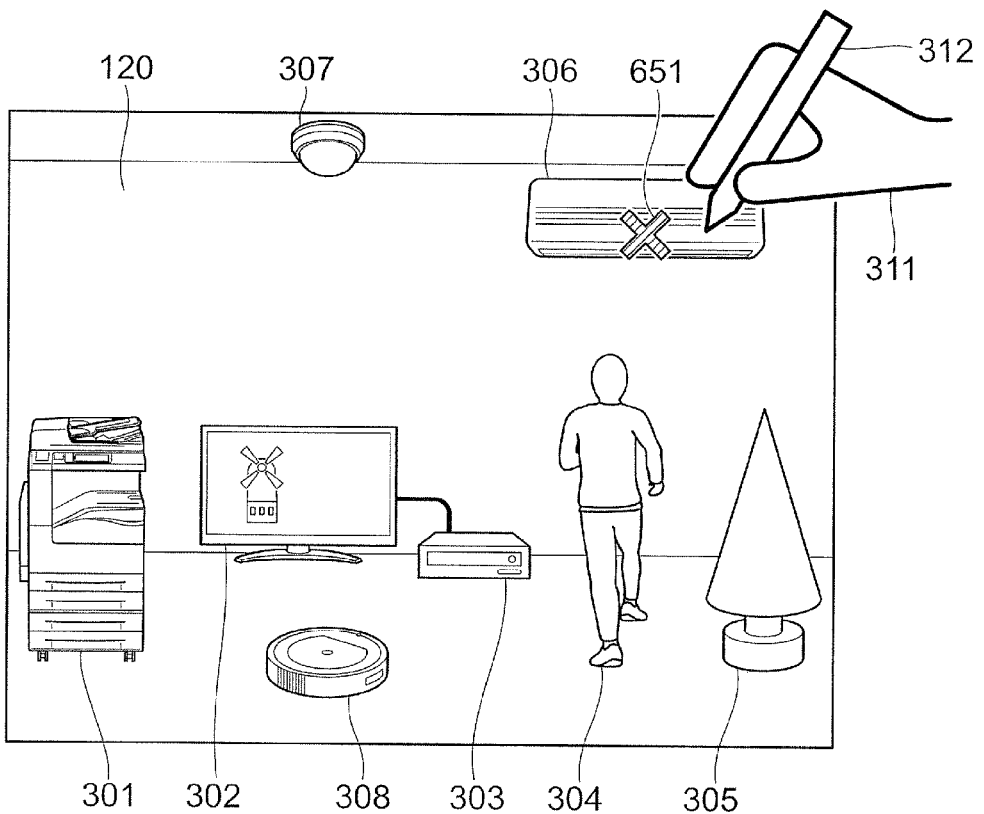

FIGS. 24A and 24B are views for explaining an example of controlling the operation of the air conditioner 156 (see FIG. 1) using the photograph 120 (see FIG. 1). FIG. 24A is an example of writing for operating the air conditioner 156. FIG. 24B is an example of writing for stopping the operation of the air conditioner 156.

Here, it is assumed that the air conditioner 156 is provided with a camera for capturing the interior and has a function of recognizing the image captured by the camera to control the operation of its own apparatus.

For example, when the user wants to operate the air conditioner 156, he/she may control the air conditioner 156 to be in an operation state by directing the photograph 120 in which a circle mark 650 is drawn on the image 306 of the air conditioner, toward the air conditioner 156 (see FIG. 1). In this case, it is not necessary to operate the remote controller. Conversely, when the user wants to stop the operation of the air conditioner 156, he/she may direct the photograph 120 in which a cross mark 651 is drawn on the image 306 of the air conditioner, toward the air conditioner 156 (see FIG. 1).

As described above, the foregoing structure may also be used to instruct execution (on) and non-execution (off) of the operations of the devices.

In the above-described exemplary embodiment, the description has been made of the use example assuming an indoor use such as the cleaning robot 158 (see FIG. 1). The above-described structure is also convenient for an outdoor use.

Figure 25:
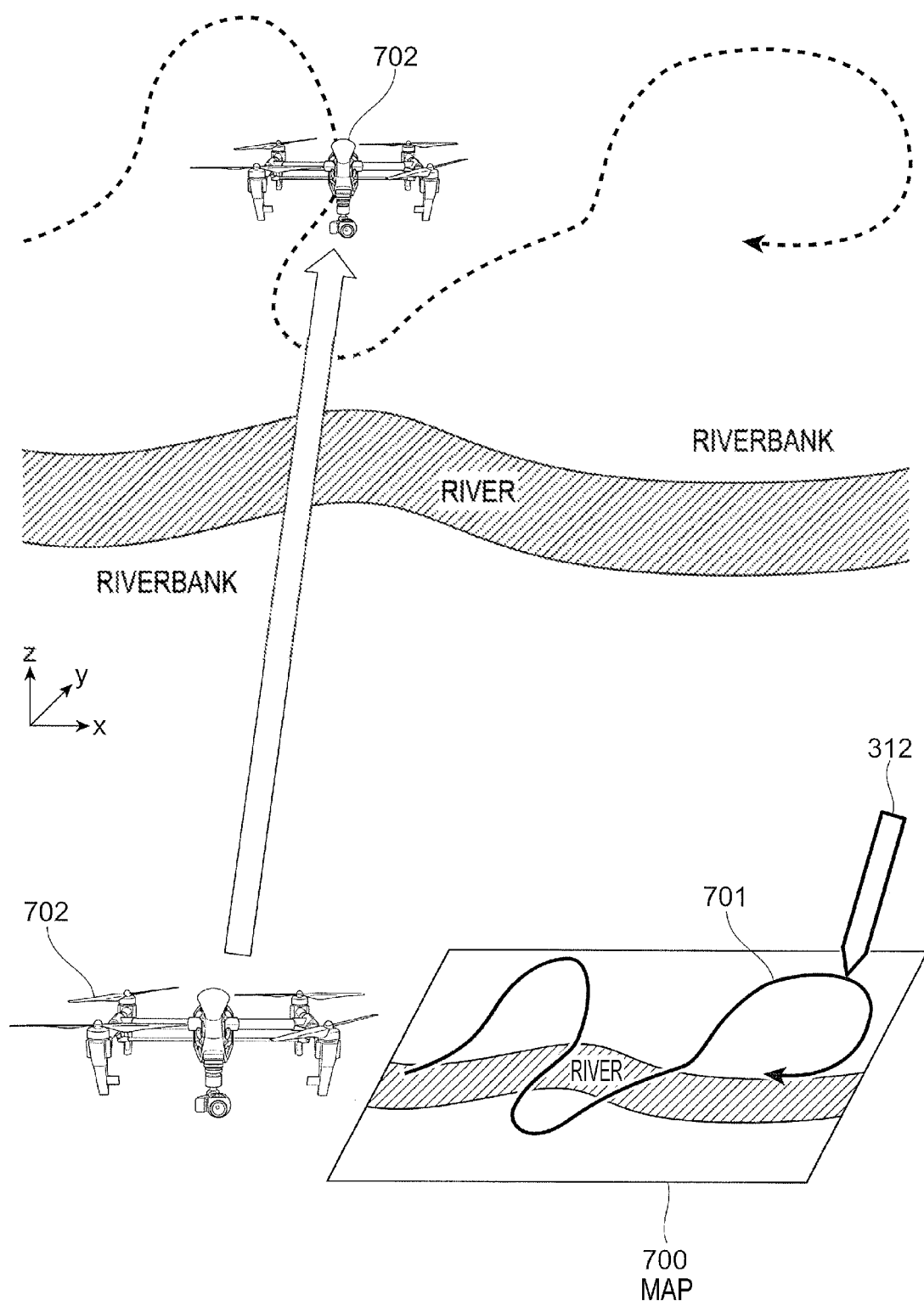
FIG. 25 is a view illustrating an example of controlling the flight of a drone by drawing a flight route using a pen on the surface of a map.

FIG. 25 is a view for explaining an example in which a flight route 701 is drawn using a pen 312 on the surface of a map 700 to control the flight of a drone 702.

Here, the drone 702 is an example of an unmanned airplane. In addition to a propeller necessary for flight, the drone 702 is provided with a steering mechanism that controls the traveling direction, a camera that captures the ground or the like, a controller that controls the operation of each unit, and the like. Here, the flight route may be simply instructed by directing the map 700 toward the camera of the drone 702.

Further, the object to be controlled may be an airship or an unmanned vehicle. The broken line in the figure is the flight route of the drones 702 in the air.

In the above-described exemplary embodiments, the workflow process is recorded in a portion of the attribute information 516 (see FIG. 16) using the JSON format. Alternatively, the workflow process may be recorded in a portion of the attribute information 516 in the format of sound data or a text format other than the JSON format or recorded in another file associated with the JPEG file 500 (see FIG. 16). For example, when there is a limit on the data region allocated to the attribute information 516, the workflow process may be recorded as another file.

When the workflow process is recorded in the format of sound data, the reproduction sound of the sound data may be analyzed to perform the corresponding workflow process. In this case, the sound data may be recorded as a combination of tone signals. Further, the workflow process may be executed by analyzing the frequency components and waveform patterns without reproducing the sound data.

In the above-described exemplary embodiments, when an image associated with the information 513A (see FIG. 16) is designated on a still image, the associated workflow process is only executed. Alternatively, the operation of the user during the execution of the workflow process may be recorded and added to the existing information 513A. With this function, what the user is required is only to designate a specific image and the user may omit subsequent operations.

In the above-described exemplary embodiments, the operation of the cleaning robot 158 (see FIG. 1) is controlled through the still image 111 (see FIG. 1). Alternatively, the operation of the cleaning robot 158 (see FIG. 1) may be controlled through a moving image. In the case of the moving image, different instructions may be given in plural sections on a time axis. For example, the cleaning range may be instructed in a few seconds (first section) from the start of the reproduction of the moving image, the moving speed may be instructed in the following second section, and the cleaning quality may be instructed in the subsequent third section. It is also possible to give plural instructions at once. With this function, it is also possible to instruct the cleaning with a normal suction force at a high speed at an early stage while instructing the cleaning with a strong suction force at a slow speed from the intermediate.

In this way, when a moving image is used to control the operation, the contents of the control may be changed with the lapse of time.

In the above-described exemplary embodiments, the description has been made of the case of controlling the movement route through the image (including the control of the accompanying mechanism), the case of controlling the quality of the operation, and the case of controlling the execution (on) and non-execution (off) of the operation. The above-described exemplary embodiments may also be used to control an opening and closing operation of an opening and closing mechanism, to control on/off of the power supply, to execute and stop a program, to switch a program, and the like.

For example, in the case of a computer, an image (including image data) on which letters, a logo mark, or the like that represent an operation system (OS) are written may be presented to switch the operation system to be started. This is also applicable to the case of a device activated by firmware.

Further, an image (including image data) on which letters, a logo mark, or that like are written that represent an application program to be executed may be presented to switch the application program to be executed. For example, the above-described exemplary embodiments may also be used to switch a document creation program, a spreadsheet program, and a drawing program.

In addition, the above-described image instruction may also be used to instruct switching of a processing operation to be executed by the target device. For example, when the target device is a computer, it may be used for storing, copying, sending, or the like of a file being edited. In the case of transmission, for example, a name of a transmission destination, a face picture, an address, and the like may be written in the image. When the target device is a device such as a television set, it is also possible to designate a channel to be displayed and a program or a movie to be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a receiver that receives an image; and
a processor that controls an operation of the information processing apparatus based on information written in the image received by the receiver, wherein the information defines an operation related to movement comprising a speed of the movement of the information processing apparatus and a power to operate the information processing apparatus, wherein the speed of the movement is designated from a plurality of non-zero speeds, and wherein the power to operate the information processing apparatus is designated from a plurality of non-zero powers.

2. The information processing apparatus according to claim 1, wherein the operation related to the movement further comprises direction, a route, or a range of the movement.

3. The information processing apparatus according to claim 1, wherein the information defines a quality of the operation.

4. The information processing apparatus according to claim 3, wherein the quality of the operation is given by text.

5. The information processing apparatus according to claim 3, wherein the quality of the operation is given by voice.

6. The information processing apparatus according to claim 1, wherein the information defines an execution or non-execution of the operation.

7. The information processing apparatus according to claim 1, wherein the processor executes the control based on information read from a surface of the image.

8. The information processing apparatus according to claim 7, wherein the information is written in a form of a drawing.

9. The information processing apparatus according to claim 1, wherein the information defines switching of a processing operation.

10. The information processing apparatus according to claim 1, wherein the information defines switching of a running basic program or an application.

11. The information processing apparatus according to claim 1, wherein when attribute information of an image file includes information that defines a workflow process, the processor controls a device corresponding to a specific object associated with the information.

12. The information processing apparatus according to claim 11, wherein
the image file is in compliance with a JPEG format, and
the information defining the workflow process is written in a JSON format.

13. The information processing apparatus according to claim 1, wherein when the processor recognizes that the information processing apparatus is included in the image as one of objects, the processor performs the control based on the information.

14. The information processing apparatus according to claim 1, wherein when the image is a moving image and different information is written at different reproduction times of the image, the processor changes the control according to newly recognized information.

15. The information processing apparatus according to claim 1, wherein the information processing apparatus is a cleaning robot, and wherein the information further defines the operation related to a cleaning quality of the cleaning robot, and wherein the power to operate the information processing apparatus is a suction power.

16. An information processing apparatus comprising:
a receiver that receives an image, wherein the image is a moving image including different information written at different reproduction times of the moving image on a time axis; and
a processor that reads the different information written in the image received by the receiver, controls an operation of a device corresponding to the different information, and changes the control according to newly recognized information of the different information written at the corresponding reproduction time.

17. A non-transitory computer readable medium storing a program causing a computer to execute information processing, the information processing comprising:
receiving an image; and
controlling an operation of the computer based on information written in the received image, wherein the information defines an operation related to movement comprising a speed of the movement of the information processing apparatus and a power to operate the information processing apparatus, wherein the speed of the movement is designated from a plurality of non-zero speeds, and wherein the power to operate the information processing apparatus is designated from a plurality of non-zero powers.

* * * * *